United States Patent
Wang

(10) Patent No.: US 12,526,438 B2
(45) Date of Patent: Jan. 13, 2026

(54) VIDEO TRANSCODING AND VIDEO DISPLAY METHOD, APPARATUS, AND ELECTRONIC DEVICE

(71) Applicant: HANGZHOU HIKVISION DIGITAL TECHNOLOGY CO., LTD., Zhejiang (CN)

(72) Inventor: Hou Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/724,494

(22) PCT Filed: Dec. 16, 2022

(86) PCT No.: PCT/CN2022/139653
§ 371 (c)(1),
(2) Date: Jun. 26, 2024

(87) PCT Pub. No.: WO2023/125078
PCT Pub. Date: Jul. 6, 2023

(65) Prior Publication Data
US 2025/0071300 A1    Feb. 27, 2025

(30) Foreign Application Priority Data
Dec. 30, 2021   (CN) .......................... 202111657026.X

(51) Int. Cl.
*H04N 19/40*      (2014.01)
*H04N 19/119*     (2014.01)
(Continued)

(52) U.S. Cl.
CPC ........... *H04N 19/40* (2014.11); *H04N 19/119* (2014.11); *H04N 19/136* (2014.11); *H04N 19/172* (2014.11)

(58) Field of Classification Search
None
See application file for complete search history.

(56) References Cited

U.S. PATENT DOCUMENTS 9,497,457 B1   11/2016  Gupta
2014/0146869 A1   5/2014  Zhang
(Continued)

FOREIGN PATENT DOCUMENTS

CN   104159063 A   * 11/2014
CN   107690074 A     2/2018
(Continued)

OTHER PUBLICATIONS

China National Intellectual Property Administration, International Search Report issued for PCT/CN2022/139653, mailed Mar. 6, 2023, 5 pages.
(Continued)

*Primary Examiner* — Samuel D Fereja
(74) *Attorney, Agent, or Firm* — Meunier Carlin & Curfman LLC

(57) ABSTRACT

Embodiments of the present application provide a video transcoding method, a video display method, an apparatus and an electronic device, which relate to the field of video processing technology. The video transcoding method includes: acquiring a first image in an initial images obtained by stitching multi-channel video images; determining an initial resolution of each of initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder; segmenting a to-be-cut image into respective initial sub-images based on the respective initial resolutions; encoding each initial sub-image according to a (Continued)

target resolution of a target sub-image after transcoding this initial sub-image by using a preset encoder, to obtain each of target code-streams. Compared with the prior art, by applying the solution provided by the embodiments of the present application, it is possible to transcode the video screen obtained after stitching multi-channel video screens.

17 Claims, 6 Drawing Sheets

(51) Int. Cl.
*H04N 19/136* (2014.01)
*H04N 19/172* (2014.01)

(56) References Cited

U.S. PATENT DOCUMENTS

| | | | |
|---|---|---|---|
| 2018/0007375 A1* | 1/2018 | He | H04N 19/154 |
| 2018/0061002 A1 | 3/2018 | Lee | |
| 2021/0051306 A1 | 2/2021 | Han | |
| 2021/0287337 A1 | 9/2021 | Newman | |

FOREIGN PATENT DOCUMENTS

| | | |
|---|---|---|
| CN | 111435979 A | 7/2020 |
| CN | 111447394 A | 7/2020 |
| CN | 112104835 A | 12/2020 |
| CN | 113766235 A | 12/2021 |
| CN | 114339248 A | 4/2022 |
| JP | 2013507084 A | 2/2013 |

OTHER PUBLICATIONS

China National Intellectual Property Administration, Written Opinion of the International Searching Authority issued for PCT/CN2022/139653, mailed Mar. 6, 2023, 9 pages.
First Office Action in the priority Chinese Application dated Dec. 16, 2024.
Gabriel A., et al., "Polyphase Subsampling Applied to 360 Degree Video Sequences in the Context of the Joint Call for Evidence on Video Compression," JVET-G0026, ITU, Jul. 13, 2017, pp. 1-7.
Office Action for Japanese Application No. 2024-539377, dated May 20, 2025, 9 Pages.
Second Office Action for Chinese Application No. 202111657026. X, dated Jun. 7, 2025, 21 Pages.

* cited by examiner

US 12,526,438 B2

VIDEO TRANSCODING AND VIDEO DISPLAY METHOD, APPARATUS, AND ELECTRONIC DEVICE

The present application claims the priority of a Chinese patent application No. 202111657026.X filed with the China National Intellectual Property Administration on Dec. 30, 2021 and entitled "Video transcoding and video display method, apparatus, and electronic device", which is incorporated herein by reference in its entirety

TECHNICAL FIELD

The present application relates to the field of video processing technology, and in particular to a video transcoding and video display method, apparatus and an electronic device.

BACKGROUND

Currently, in order to display a screen of the scene of a certain area more comprehensively from multiple angles, multiple video capture devices are installed in the area in order to fully cover the entire space of the area. Moreover, in order to display all the video screens in the area at the same time, the multi-channel video screens captured by the above multiple video capture devices are usually stitched and the stitched video screens are displayed.

The resolution of the above stitched video image is the sum of the resolutions of the above multi-channel video screens. However, in some cases, users wish to display screens in the stitched video screens by using other resolutions. For example, other resolutions are used to display the above stitched video screens; for another example, other resolutions are used to display a partial screen in the above stitched video screen, etc.

Based on this, how to transcode a video screen obtained after stitching multiple video so that the resolution of the decoded video screen displayed can meet the user needs has become an urgent problem to be solved.

SUMMARY

The purpose of the embodiments of the present application is to provide a video transcoding and video display method, apparatus and an electronic device, so as to achieve transcoding a video screen obtained after stitching multi-channel video screens, in order to make the resolution of the encoded video screen displayed meets the user needs. The specific technical solutions are as follows:

In a first aspect, an embodiment of the present application provides a video transcoding method, the method includes:
  acquiring a first image in an initial images obtained by stitching multi-channel video images;
  determining an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and a sum of all target resolutions is a preset resolution of a second image obtained after transcoding the first image;
  segmenting a to-be-cut image into respective to-be-transcoded initial sub-images based on respective initial resolutions;
  encoding each initial sub-image according to a target resolution of a target sub-image obtained after transcoding this initial sub-image by using the preset encoder to obtain each of target code-streams.

Optionally, in a specific embodiment, the method further includes:
  adding a specified information structure to code-stream information of each target code-stream to obtain each of to-be-encapsulated code-streams;
  encapsulating each of the to-be-encapsulated code-streams, and adding the specified information structure to encapsulation information to obtain a multi-track stream code-stream for the first image.

Optionally, in a specific embodiment, the method further includes:
  copying the multi-track stream code-stream, and transmitting the obtained multiple multi-track stream code-streams to a specified device.

Optionally, in a specific embodiment, determining an initial resolution of each of to-be-transcoded initial sub-images includes:
  determining a preset target resolution of each of the target sub-images obtained after transcoding;
  for each target resolution, based on a first proportion of the target resolution in the preset resolution and a specified resolution of the first image, determining an initial resolution corresponding to the target resolution as an initial resolution of the initial sub-image corresponding to the target resolution;
  wherein a second proportion of each initial resolution in the specified resolution is the same as the first proportion of the target resolution corresponding to the initial resolution in the preset resolution.

Optionally, in a specific embodiment, segmenting a to-be-cut image into respective to-be-transcoded initial sub-images based on respective initial resolutions, includes:
  based on the determined respective initial resolutions, segmenting the to-be-cut image into the respective to-be-transcoded initial sub-images without overlapping areas.

Optionally, in a specific embodiment, before segmenting a to-be-cut image into respective to-be-transcoded initial sub-images based on respective initial resolutions, the method further includes:
  increasing each initial resolution that does not meet a byte alignment requirement of the preset encoder to a resolution that meets the byte alignment requirement to obtain each of cutting resolutions;
  wherein segmenting the to-be-cut image into respective to-be-transcoded initial sub-images based on respective initial resolutions, includes:
  based on each of available resolutions and each of the cutting resolutions, segmenting the first image into the respective to-be-transcoded initial sub-images; wherein the available resolution is an initial resolution that meets the byte alignment requirement; wherein the respective initial sub-images comprise initial sub-images with overlapping areas;
  wherein encoding each initial sub-image according to a target resolution of a target sub-image obtained after transcoding this initial sub-image by using the preset encoder to obtain each of target code-streams, includes:
  for each initial sub-image whose resolution is an available resolution, encoding by using the preset encoder, this initial sub-image according to the target resolution of the target sub-image obtained after transcoding this initial sub-image, to obtain a target code-stream;

for each initial sub-image whose resolution is a cutting resolution, encoding by using the preset encoder, this initial sub-image according to an encoding resolution of this initial sub-image and adding a tag for specified pixels in code-stream information of the obtained code-stream to obtain a target code-stream;

wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

Optionally, in a specific embodiment, before encoding by using the preset encoder, this initial sub-image according to an encoding resolution of this initial sub-image, the method further includes:

determining whether the cutting resolution of this initial sub-image is not greater than the maximum resolution of the input data that can be supported by the preset encoder, and whether the encoding resolution of this initial sub-image is not greater than the maximum resolution of the output data that can be supported by the preset encoder;

if so, encoding by using the preset encoder, this initial sub-image according to the encoding resolution of this initial sub-image;

otherwise, returning to the step of determining an initial resolution of each of the to-be-transcoded initial sub-images.

In a second aspect, an embodiment of the present application provides a video display method, the method includes:

acquiring each of target code-streams for a target image; wherein each of the target code-streams is obtained based on any video transcoding method according to the first aspect;

decoding each target code-stream to obtain a transcoded target sub-image corresponding to each target code-stream;

stitching the obtained respective target sub-images to obtain the target image for displaying.

Optionally, in a specific embodiment, decoding each target code-stream to obtain a transcoded target sub-image corresponding to each target code-stream, includes:

for each target code-stream, detecting whether there is a tag for specified pixels in the target code-stream;

if so, decoding the target code-stream, and cutting off an image area corresponding to the specified pixels from the decoded image to obtain the transcoded target sub-image corresponding to the target code-stream;

if not, decoding the target code-stream to obtain the transcoded target sub-image corresponding to the target code-stream.

In a third aspect, an embodiment of the present application provides a video transcoding apparatus, which includes:

an image acquisition module, configured to acquire a first image in an initial images obtained by stitching multi-channel video images;

a resolution determination module, configured to determine an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and a sum of all target resolutions is a preset resolution of a second image obtained after transcoding the first image;

an image segmenting module, configured to segment a to-be-cut image into respective to-be-transcoded initial sub-images based on respective initial resolutions;

an image encoding module, configured to encode each initial sub-image according to a target resolution of a target sub-image obtained after transcoding this initial sub-image by using the preset encoder to obtain each of target code-streams.

Optionally, in a specific embodiment, the apparatus further includes: a code-stream encapsulation module, configured to add a specified information structure to code-stream information of each target code-stream to obtain each of to-be-encapsulated code-streams; and encapsulate each of the to-be-encapsulated code-streams, and add the specified information structure to encapsulation information to obtain a multi-track stream code-stream for the first image.

Optionally, in a specific embodiment, the apparatus further includes: a code-stream copying module, configured to copy the multi-track stream code-stream, and transmit the obtained multiple multi-track stream code-streams to a specified device.

Optionally, in a specific embodiment, the resolution determination module is specifically configured to: determine a preset target resolution of each of the transcoded target sub-images; for each target resolution, based on a first proportion of the target resolution in the preset resolution and a specified resolution of the first image, determine an initial resolution corresponding to the target resolution as an initial resolution of the initial sub-image corresponding to the target resolution; wherein a second proportion of each initial resolution in the specified resolution is the same as the first proportion of the target resolution corresponding to the initial resolution in the preset resolution.

Optionally, in a specific embodiment, the image segmenting module is specifically configured to: based on the determined respective initial resolutions, segment the to-be-cut image into the respective to-be-transcoded initial sub-images without overlapping areas.

Optionally, in a specific embodiment, the apparatus further includes: a resolution changing module, configured to increase each initial resolution that does not meet a byte alignment requirement of the preset encoder to a resolution that meets the byte alignment requirement to obtain each of cutting resolutions, before segmenting a to-be-cut image into respective to-be-transcoded initial sub-images based on respective initial resolutions;

the image segmenting module is specifically configured to: segment the first image into the respective to-be-transcoded initial sub-images based on each of available resolutions and each of the cutting resolutions; wherein the available resolution is an initial resolution that meets the byte alignment requirement; wherein the respective initial sub-images comprise initial sub-images with overlapping areas;

the image encoding module is specifically configured to: for each initial sub-image whose resolution is an available resolution, encode by using the preset encoder, this initial sub-image according to the target resolution of the target sub-image obtained after transcoding the initial sub-image, to obtain a target code-stream; for each initial sub-image whose resolution is a cutting resolution, encode by using the preset encoder, this initial sub-image according to an encoding resolution of this initial sub-image and add a tag for specified pixels in code-stream information of the obtained code-stream to obtain a target code-stream; wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

Optionally, in a specific embodiment, the apparatus further includes: a resolution determination module, configured to determine, before encoding by using the preset encoder, this initial sub-image according to an encoding resolution of this initial sub-image, whether the cutting resolution of this initial sub-image is not greater than the maximum resolution of the input data that can be supported by the preset encoder, and whether the encoding resolution of this initial sub-image is not greater than the maximum resolution of the output data that can be supported by the preset encoder; if so, trigger the image encoding module, otherwise, trigger the resolution determination module.

In a fourth aspect, embodiments of the present application provide a video display apparatus, which includes:

a code-stream acquisition module, configured to acquire each of target code-streams for a target image; wherein the target code-stream is obtained based on any video transcoding method according the first aspect;

a code-stream decoding module, configured to decode each target code-stream to obtain a transcoded target sub-image corresponding to each target code-stream;

an image stitching module, configured to stitch the obtained respective target sub-images to obtain the target image for displaying.

Optionally, in a specific embodiment, the code-stream decoding module is specifically configured to: for each target code-stream, detect whether there is a tag for specified pixels in the target code-stream; if so, decode the target code-stream, and cut off an image area corresponding to the specified pixels from the decoded image to obtain the transcoded target sub-image corresponding to the target code-stream; if not, decode the target code-stream to obtain the transcoded target sub-image corresponding to the target code-stream.

In a fifth aspect, an embodiment of the present application provides an electronic device, including a processor, a communication interface, a memory, and a communication bus, wherein the processor, the communication interface, and the memory complete communication with each other through the communication bus; the memory is configured to store a computer program; the processor is configured to implement the steps of any video transcoding method according to the first aspect, and/or the steps of any video display method according to the second aspect when executing the program stored in the memory.

In a sixth aspect, an embodiment of the present application provides a computer-readable storage medium, which stores a computer program that, when executed by a processor, cause the processor to implement the steps of any video transcoding method according to the first aspect, and/or the steps of any video display method according to the second aspect.

In a seventh aspect, an embodiment of the present application provides a computer program product containing instructions which, when run on a computer, cause the computer to perform the steps of any video transcoding method according to the first aspect, and/or the steps of any video display method according to the second aspect.

BENEFICIAL EFFECTS OF THE EMBODIMENTS OF THIS APPLICATION

It can be seen from the above that by applying the solution provided by the embodiments of the present application, when transcoding the video screen obtained after stitching multi-channel video images, the encoder for transcoding can be preset according to the user's needs, it further be determined the maximum resolutions of input data and output data that can be supported by the preset encoder.

In this way, after acquiring the to-be-transcoded initial image obtained by stitching multi-channel video images, firstly the to-be-transcoded first image can be acquired from the initial image. Furthermore, the initial resolution of each of the to-be-transcoded initial sub-images obtained by segmenting the first image can be determined. Wherein each initial resolution is not greater than the maximum resolution of the input data that can be supported by the above preset encoder, and the target resolution of the target sub-image obtained after encoding each initial sub-image is not greater than the maximum resolution of the output data that can be supported by the above preset encoder, and the sum of all target resolutions is a preset resolution of a second image obtained after transcoding the first image. After that, encoding each initial sub-image according to a target resolution of a target sub-image obtained after transcoding this initial sub-image by using the preset encoder, in order to obtain each of target code-streams.

For each initial sub-image, since the initial sub-image is encoded according to a target resolution of a target sub-image obtained after transcoding this initial sub-image, after decoding the target code-stream obtained after encoding, the resolution of the resulting target sub-image is the above target resolution. Furthermore, since the sum of all the target resolutions is the preset resolution of the second image obtained after transcoding the first image, then after decoding each of the target code-streams, the sum of the resolutions of the respective target sub-images obtained is also the above preset resolution. Thus, it is possible to transcode the first image mentioned above, so that the resolution of the second image displayed after decoding can meet the user's needs.

In addition, the solution provided by the embodiments of the present application is applied, by encoding multiple initial sub-images, the transcoding of the above first image is completed, it is possible to avoid the limitation of the maximum resolutions of input data and output data that can be supported by the preset encoder when encoding the entire first image. Moreover, since the number of multiple target sub-images may not be equal to that of multi-channel video images, which are stitched to obtain the above initial image, it is possible to avoid the limitation that the preset resolution of the transcoded target image must be an integral multiple of the number of the above multi-channel video images when encoding respectively the multi-channel video images which stitched to obtain the above initial image. In this way, the above first image can be transcoded more flexibly.

Of course, it is not necessary to achieve all the above advantages simultaneously when implement any product or method of the present application.

BRIEF DESCRIPTION OF THE DRAWINGS

In order to more clearly describe the technical solutions of the embodiments of the present application and the prior art, accompanying drawings that need to be used in the embodiments and the prior art will be briefly described below. Obviously, accompanying drawings described below are for only some of embodiments of the present application. Those skilled in the art may also obtain other accompanying drawings based on these accompanying drawings without any creative efforts.

DETAILED DESCRIPTION

Figure 1:
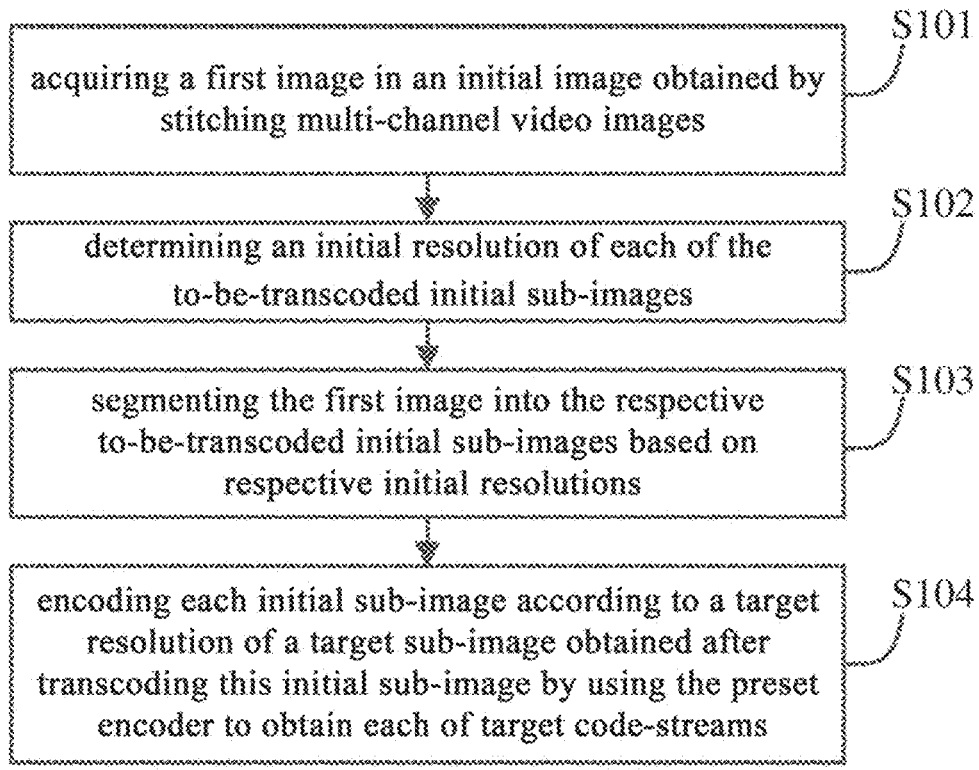
FIG. 1 is a schematic flow chart of a video transcoding method provided by an embodiment of the present application.

In order to make the objective, technical solutions and advantages of the application clearer and more understandable, the application will be described in more detail below with reference to the accompanying drawings and embodiments. Obviously, the described embodiments are only some, and not all, of the embodiments of the application. All other embodiments obtained based on the embodiments of the application by those skilled in the art without any creative efforts fall into the scope of protection of the present application.

In the related technology, the resolution of the stitched video image is the sum of the resolutions of multi-channel video screens. However, in some cases, users wish to use other resolutions to display a screen in the above stitched video screen. For example, other resolutions are used to display the above stitched video screen; another example is that other resolutions are used to display a partial screen of the above stitched video screen, etc. Based on this, how to transcode a video screen obtained after stitching multiple video so that the resolution of the video screen displayed after decoding can meet the user's needs has become an urgent problem to be solved.

In order to solve the above technical problem, embodiments of the present application provide a video transcoding method.

The so-called transcoding refers a process that, after decoding the video code-stream, re-encoding the decoded video code-stream into a code-stream with a customized code-stream format or a parameter, so that the re-encoded code-stream can meet the customer's requirements for network bandwidth limitations, and accessing to specific platforms.

Wherein, the method is suitable for any application scenario that requires transcoding an image in a video image obtained by stitching multi-channel video screens, such as factory scenario, road traffic scenario, etc. Moreover, the method can be applied to any electronic device that can transcode a video screen to obtain a video code-stream, for example, a capture device with image processing function, a server that is communicatively connected to the capture device, or a display device that is communicatively connected to the capture device, etc. Based on this, the embodiments of this application do not specifically limit the application scenarios and execution subjects of the method.

A video transcoding method provided by an embodiment of the present application may include the following steps:

acquiring a first image in an initial image obtained by stitching multi-channel video images;

determining an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and a sum of all target resolutions is a preset resolution of a second image after transcoding the first image;

segmenting a to-be-cut image into the respective to-be-transcoded initial sub-images based on respective initial resolutions;

encoding each initial sub-image according to a target resolution of a target sub-image obtained after transcoding this initial sub-image by using the preset encoder to obtain each of target code-streams.

It can be seen above that by applying the solution provided by the embodiment of the present application, when transcoding the video screen obtained after stitching multi-channel video images, the encoder for transcoding can be preset according to the user's needs, it further be determined the maximum resolutions of input data and output data that can be supported by the preset encoder.

In this way, after acquiring the to-be-transcoded initial images obtained by stitching multi-channel video images, firstly the to-be-transcoded first image can be acquired from the initial images. Furthermore, an initial resolution of each of to-be-transcoded initial sub-images obtained by segmenting the first image can be determined. Wherein each initial resolution is not greater than the maximum resolution of the input data that can be supported by the above preset encoder, and the target resolution of the target sub-image obtained after encoding each initial sub-image is not greater than the maximum resolution of the output data that can be supported by the above preset encoder, and the sum of all the target resolutions is the preset resolution of the second image obtained after transcoding the first image. After that, the first image can be segmented into respective to-be-transcoded initial sub-images based on respective initial resolutions, and each initial sub-image can be encoded according to a target resolution of a target sub-image obtained after transcoding this initial sub-image by using the preset encoder to obtain each of target code-streams.

For each initial sub-image, since the initial sub-image is encoded according to a target resolution of a target sub-image obtained after transcoding this initial sub-image, after decoding the target code-stream obtained after encoding, the resolution of the resulting target sub-image is the above target resolution. Furthermore, since the sum of all the target resolutions is the preset resolution of the second image obtained after transcoding the first image, then after decoding each of the target code-streams, the sum of the resolutions of the respective target sub-images obtained is also the above preset resolution. Thus, it is possible to transcode the first image mentioned above, so that the resolution of the second image displayed after decoding can meet the user's needs.

In addition, the solution provided by the embodiments of the present application is applied, by encoding multiple initial sub-images, the transcoding of the above first image is completed, it is possible to avoid the limitation of the maximum resolutions of input data and output data that can be supported by the preset encoder when encoding the entire first image. Moreover, since the number of multiple target sub-images may not be equal to that of multi-channel video images, which are stitched to obtain the above initial image, it is possible to avoid the limitation that the preset resolution of the transcoded target image must be an integral multiple of the number of the above multi-channel video images when encoding respectively the multi-channel video images which stitched to obtain the above initial image. In this way, the above first image can be transcoded more flexibly.

A video transcoding method provided by embodiments of the present application will be described in detail below with reference to the accompanying drawings.

FIG. 1 is a schematic flow chart of a video transcoding method provided by an embodiment of the present application. As shown in FIG. 1, the method may include the following steps:

S101. acquiring a first image in an initial image obtained by stitching multi-channel video images;

when transcoding a video, an initial image obtained by stitching the multi-channel video images can be acquired first, furthermore the to-be-transcoded first image can be acquired from the initial image.

Wherein the above first image may be a complete initial image, thereby transcoding the above initial image; the above first image may also be a partial image in the initial image, thereby transcoding the partial image in the above initial image.

Wherein multiple video capture devices can be provided, and each video capture device can capture video in its corresponding capture area, thereby obtaining multi-channel video code-streams. Furthermore, after decoding the above multi-channel video code-streams, the multi-channel video images can be obtained. In this way, the multi-channel video images can be stitched to obtain the initial image. Moreover, a resolution of the initial image is the sum of the resolutions of the multi-channel video images.

Optionally, the above initial image may be obtained by decoding the multi-track stream code-stream.

Wherein, the so-called multi-track stream code-stream refers to a video stream composed of multi-track video code-streams. Specifically, multi-track video code-streams can be obtained through a physical channel, and video image processing is performed on the obtained multi-track video code-streams in the physical channel, thereby obtaining multi-track stream code-stream, then the physical channel can be called a multi-track flow channel.

That is to say, multimedia data captured by multiple multimedia data capture devices can be encapsulated into multi-track stream, and the multi-track stream code-stream can include multimedia data captured by the multiple multimedia data capture devices at the same moment, and the multimedia data of each of the multimedia data capture devices is individually encoded. Wherein the above same moment is not limited to the same time, and preset errors may also be allowed.

For example, the multimedia data captured by the multiple multimedia data capture devices can be encapsulated into a multi-track stream according to a preset encapsulation protocol, which can include but is not limited to RTP (Real-time Transport Protocol), etc.

For another example, the encoded multimedia data of the multiple target multimedia data capture devices can be encapsulated into a multi-track stream according to a preset transmission encapsulation protocol.

In this way, a video screen corresponding to the multi-track stream code-stream is: a screen displayed on the same total display surface that is obtained by seamlessly stitching the video screens respectively corresponding to the multi-track video code-streams which constituting the multi-track stream code-stream, that is, the above initial image is a screen displayed on the same total display surface that is obtained by seamlessly stitching the video screens respectively corresponding to the multi-track video code-stream which constituting the multi-track stream code-streams.

Compared to an ordinary code-stream that only corresponds to one-track video code-stream, encapsulation information corresponding to the multi-track stream code-stream and naked stream information of each track code-stream included thereof are added with MFI (Multiple Frame Indicator) information structure, the MFI information structure is used to represent the number of tracks of the video code-stream included in the multi-track stream code-stream, a start tag and an end tag of the video code-stream, and stitching information in the video screens corresponding to the video code-streams of each of the tracks, etc.

That is to say, the above MFI information structure may include but is not limited to:

a data packet type identifier, a frame start identifier, a frame end identifier, the serial number of a synthesized frame, and the total number of tracks of a synthesized frame. For example, multi-track stream code-streams of n tracks are RTP0 header+RTP0 payload+MFI0+RTP1 header+RTP1 payload+MFI1+RTPn header+ . . . +RTPn payload+MFIn.

Wherein, the data packet type identifier is configured to identify a type of a data packet carried in the multi-track stream code-stream, which includes but is not limited to video data, audio data or picture data, etc.; for example, the data packet type identifier can include at least 4 identifier values, respectively configured to identify video, audio, a private frame, etc.; for example, 00 identifies video, 01 identifies audio, 10 identifies a private frame, and 11 is reserved.

The frame start identifier is configured to identify whether the data packet carried in the multi-track stream code-stream is a data packet at the beginning of the frame; for example, the frame start identifier can include at least 2 identifier values, which are configured to identify whether it belongs to the beginning of the frame or not; for example, 1 identifies a data packet at the beginning of the frame, 0 identifies a data packet that is not at the beginning of the frame.

The frame end identifier is configured to identify whether the data packet carried in the multi-track stream code-stream is a data packet at the end of the frame; for example, the frame end identifier can include at least 2 identifier values, which are configured to identify whether it belongs to the end of the frame or not; for example, 1 identifies a data packet at the end of the frame, 0 identifies a data packet that is not at the end of the frame.

The frame type identifier is configured to identify a frame type corresponding to the data packet carried in the multi-track stream code-stream; for example, for a video frame, it may include but is not limited to I frame, P frame or B frame, etc. Therefore, the frame type identifier may include at least 4 identifier values, which is configured to identify the I frame, the P frame or the B frame respectively when the data packet type is video; for example, 00 identifies the I frame, 01 identifies the P frame, 10 identifies the B frame, 11 is reserved.

The serial number of the synthesized frame is configured to identify a track where the data packet carried in the multi-track stream code-stream is located (one target multimedia data capture device corresponds to one track);

the total number of tracks of the synthesized frame is configured to identify how many tracks of data are carried in the multi-track stream code-stream (i.e., multimedia data of how many target multimedia data capture devices).

Wherein a sub-video screen corresponding to each track video code-stream in video screens corresponding to the multi-track stream code-stream can be called each track screen. Correspondingly, a sub-video screen corresponding to the Nth track video code-stream in the video screen corresponding to the multi-track stream code-stream can be called the Nth track screen.

In addition, for a video screen corresponding to multi-track stream code-stream, the resolution of the video screen is the sum of the resolutions of the video screens corresponding to the multi-track video code-streams constituting the video screen. Based on this, when a video screen with a larger resolution is required in actual applications, it can be achieved through multi-track stream code-stream. Moreover, as the number of tracks of the video code-streams corresponding to the multi-track stream code-stream increase, the resolution of the video screen corresponding to the multi-track stream channel can be infinitely increased.

Moreover, for the video screen corresponding to the multi-track stream code-stream, the size of a video screen corresponding to each track video code-stream in the video screens may be the same or different.

Figure 2:
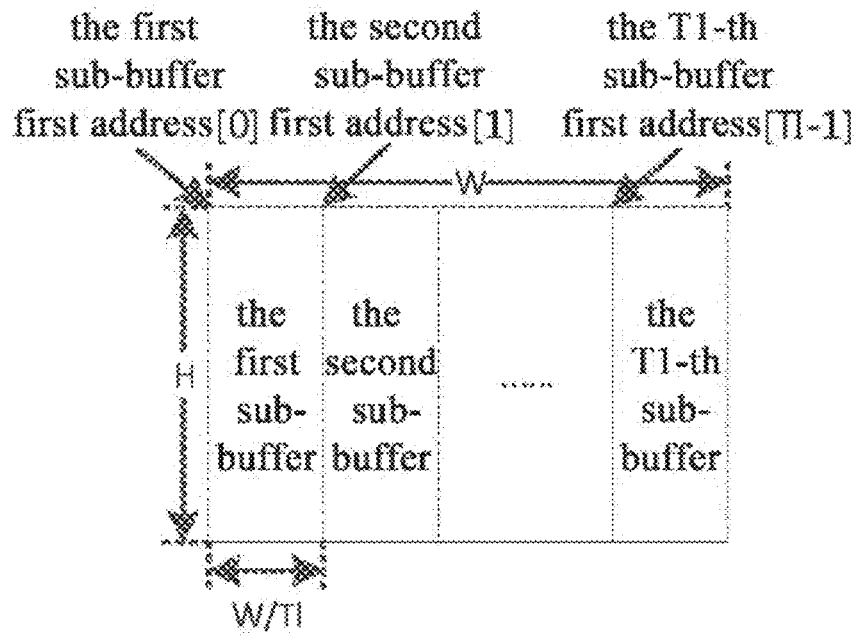
FIG. 2 is a schematic diagram of stitching multi-track code-stream included in the multi-track stream code-streams in an example.

As shown in FIG. 2, when obtaining the video screen corresponding to the multi-track stream code-stream by stitching, a code-stream of the latest video screen of the multi-track stream code-stream can be acquired firstly. The code-stream of the latest video screen is a continuous stream of multiple tracks containing the MFI information structure. Wherein TI in the MFI information structure indicates the total amount of tracks included in the multi-track stream code-stream, and N in the MFI information structure indicates that the current code-stream is the code-stream of the Nth track in the multi-track stream code-stream. In this way, the process of decoding and stitching the latest frame of the video screen of the multi-track stream code-stream can include the following steps:

Step 1: acquiring a width and a height of the video screen corresponding to each of the track code-streams from frame information of this frame of the video screen.

Step 2: assigning frame buffer Pool to each of the track code-streams included in the multi-track stream code-stream, which is configured to store the decoded data of each of the track code-streams. For example, if the resolution of the video screen corresponding to the multi-track stream code-stream is: a width of W and a height of H, then the assigned frame buffer Pool has a width of W and a height of H.

Step 3: dividing the above frame buffer Pool into TI sub-buffers pool[1]-pool[TI], and the width of each sub-buffer is W/TI and the height is H, and recording first addresses of the TI sub-buffers are pool[0] to pool[TI−1].

Step 4: decoding each of the track code-streams included in the multi-track stream code-stream in sequence; wherein, if the current code-stream is the first track code-stream in the multi-track stream code-stream, that is, N=1, then starting from the the first address addr[0] of the first sub-buffer pool[1], store the YUV data obtained after decoding the first track code-stream into the frame buffer Pool. Furthermore, storing the YUV data obtained after decoding each of the track code-streams included in the multi-track stream code-stream into the frame buffer Pool through the first address addr[0]-addr[TI−1] of the TI sub-buffers sub-buffer pool[1]-the sub-buffer pool[T1] respectively. Wherein, the decoded YUV data of each track code-stream is YUV data with a width of W/TI and a height of H.

Wherein in the YUV data, Y represents Luminance, Luma, U and V represent Chrominance, Chroma.

Moreover, each sub-buffer can be called a sub-display surface. That is to say, in multi-track stream code-stream, the decoded video screen of each track code-stream is buffered in the sub-display surface assigned for the track code-stream. Moreover, the resolution of the sub-display surface is the same as the resolution of the video screen of the decoded track code-stream.

Step 5: If the code-stream of the TI-th track included in the multi-track stream code-stream is decoded, that is, N=TI, then the YUV data obtained after decoding all the track code-streams included in the multi-track stream code-stream for stitching the latest frame of video screen has been stored in the frame buffer Pool. At this time, the decoding and stitching for the multi-track stream code-stream are completed.

Herein, the latest frame of the video screen after decoding and stitching can be displayed on the same total display surface, and thus can be configured for a subsequent display, transmission, and storage of video screen.

That is to say, the video images buffered by each the above sub-display surface can be buffered to the same total display surface, and the resolution of the total display surface is the sum of the resolutions of all the above sub-display surfaces, that is, the resolution of the total display surface is the sum of the resolutions of the video screens corresponding to each of the track code-streams included in the multi-track stream code-stream.

Wherein when the above total display surface is displayed, for the display window, the video screen in one display surface is equivalent to the display window displaying one channel video screen, and the display processing will not be performed in the same way as displaying multi-channel video screens, therefore, there will be no stitching gaps. As shown in FIG. 2, two vertical lines are specially added to illustrate the video screens corresponding to the multi-track stream code-stream. However, when displayed in actual applications, these two lines do not exist.

It should be emphasized that the arrangement of the video screens corresponding to the respective track code-streams in FIG. 2 is only an illustration of the stitching method of the video screen corresponding to each of the track code-streams included in the multi-track stream code-stream, and is not a limitation. In various embodiments, the video screen corresponding to each of the track code-streams included in the multi-track stream code-stream can be stitched in various other ways.

Wherein the position of each sub-display surface corresponding to the total display surface can be determined based on the positional relationship of the video screens corresponding to the respective track code-streams included in the multi-track stream code-stream; for each sub-display surface, the video image in the sub-display surface is buffered to the position corresponding to the sub-display surface in the total display surface.

For example, the positional relationship of the video screens corresponding to the respective track code-streams included in the multi-track stream code-stream may be consistent with the positional relationship of the multimedia data capture devices that capture the respective track code-streams. For example, if the capture device 1 is located on the far left, then the position of the sub-display surface where the video screen corresponding to the first track code-stream captured by the multimedia data capture device 1 is located corresponding to the total display surface can be the leftmost side of the total display surface.

For another example, a position setting instruction set by the user according to the actual application requirements can be received, and the position of a video screen corresponding to each of the track code-streams included in the multi-track stream code-stream corresponding to total display surface in the position setting instruction can be read. For example, the position setting instruction may include the following information: vertically stitching the video screens corresponding to the respective track code-streams according to the serial number of each of the track code-streams; horizontally stitching the video screens corresponding to the respective track code-streams according to the serial number of each of the track code-streams.

In addition, since there may be an overlapping range between the capture ranges of the multimedia data capture devices that capture the respective track code-streams, there may be an overlapping area between the video screens obtained by decoding the respective track code-streams. Therefore, position information of the overlapping ranges between the capture ranges of the respective multimedia data capture devices can be known in advance, and then, after decoding each of the track code-streams to obtain the video screen, first cutting off the overlapping area from the resulting video screen according to the above position information, then buffering the cut video screen to each of the sub-display surfaces. That is to say, the video screens buffered in each of the above sub-buffers are screens without overlapping areas. That is, in the above steps 1-5, the video screens corresponding to each of the track code-streams are screens without overlapping areas.

S102: determining an initial resolution of each of to-be-transcoded initial sub-images;

wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and the sum of all the target resolutions is a preset resolution of a second image obtained after transcoding the first image;

when transcoding the first image, a preset encoder for encoding the first image can be determined in advance, and a maximum resolution of input data and a maximum resolution of output data that can be supported by the encoder can be obtained.

wherein, when transcoding the above first image, the resulting transcoded code-streams may be composed of multiple code-streams, and each code-stream is obtained by encoding a to-be-transcoded initial sub-image by the above preset encoder, and each to-be-transcoded initial sub-image is a sub-image of the above first image.

Therefore, in order to be able to obtain each of the to-be-transcoded initial sub-image through segmenting the first image, after obtaining the above first image, the initial resolution of each of the to-be-transcoded initial sub-images may be further determined.

Wherein, considering the resolution limitation of the above preset encoder for the input data, each of the determined initial resolutions is not greater than the maximum resolution of the input data that can be supported by the preset encoder; and the image obtained by stitching each of the initial sub-images includes the entire image area of the above first image.

Optionally, the initial resolution of each of the initial sub-images may be preset.

Optionally, the initial resolution of each of the initial sub-images may be determined based on the preset number of initial sub-images and the specified resolution of the first image. For example, the specified resolution of the first image is evenly assigned to each of the initial sub-images, so that the initial resolution of each of the initial sub-image is the same, further, the target resolution of each of the target sub-images is also the same.

Optionally, the initial resolution of each of the initial sub-images may be determined based on the preset target resolution of the target sub-image after transcoding each of the images, and the preset resolution of the second image obtained after transcoding the first image.

For the second image obtained after transcoding the above first image, the second image is obtained by stitching the target sub-image after transcoding each of the initial sub-images. That is to say, for each initial sub-image, the above encoder encodes the initial sub-image to obtain a code-stream. Then, after decoding the code-stream, the target sub-image after transcoding the initial sub-image can be obtained. The resolution of the target sub-image needs to meet the resolution limitation of the above preset encoder for the output data.

Based on this, considering the resolution limitation of the above preset encoder for the output data, the target resolution of the target sub-image after transcoding of each initial sub-image is not greater than the maximum resolution of the output data that the above preset encoder can be support; and, since the second image after transcoding the above first image is obtained by stitching each of the target sub-images, in order to make the resolution of the image obtained by stitching each of the target sub-images be the preset resolution of the second image obtained after transcoding the above first image, therefore, the sum of the respective resolutions is the preset resolution of the second image after transcoding the above first image.

Wherein the above preset resolution of the second image refers to a resolution of this second image desired by the user after transcoding the above first image to obtain the code-stream, when the code-stream is decoded to obtain the transcoded second image.

For example, the resolution of the above first image is: a width of DW and a height of DH. After transcoding the first image to obtain the code-stream, when decoding the code-stream to obtain the transcoded second image, the resolution of the second image desired by the user is: a width of W0 and a height of H0, then the preset resolution of the above second image is the width of W0 and the height of H0.

Optionally, the preset resolution of the second image may be greater than the specified resolution of the first image, may be smaller than the specified resolution of the first image, or may be equal to the specified resolution of the first image. That is to say, scaling of the transcoded second image to the to-be-transcoded first image can be achieved by using the preset resolution of the second image and the specified resolution of the first image.

Wherein, when the preset resolution of the above second image is greater than the specified resolution of the above first image, image enlargement of the transcoded second image to the to-be-transcoded first image can be achieved; when the preset resolution of the above second image is smaller than the specified resolution of the first image, image reduction of the transcoded second image to the to-be-transcoded first image can be achieved.

Wherein the preset resolution of the above second image and the number of the respective initial sub-images can be set by the user according to actual application requirements, and are not specifically limited in this embodiment of the present application. For example, the above specified quantity can be 2, 3, etc.

Optionally, in a specific embodiment, the above step S102 may include the following steps 11-12:

Step 11: determining a preset target resolution of each of the transcoded target sub-images;

Step 12: for each target resolution, based on a first proportion of the target resolution in the preset resolution and a specified resolution of the first image, determining an initial resolution corresponding to the target resolution as an initial resolution of the initial sub-image corresponding to the target resolution;

wherein a second proportion of each initial resolution in the specified resolution is the same as the first proportion of the target resolution corresponding to the initial resolution in the preset resolution.

In this specific embodiment, in order to realize the scaling of the transcoded second image to the to-be-transcoded first image, each of the target sub-images scales the corresponding initial sub-image equally.

That is, the ratio of the initial resolution of each initial sub-image to the target resolution of the transcoded initial sub-image is the same. In this way, when the sum of the initial resolutions of each of the initial sub-images is the specified resolution of the above first image, the proportion of the initial resolution of each initial sub-image in the specified resolution is equal to that of the target resolution of the transcoded initial sub-image in the preset resolution of the above second image.

Wherein when transcoding the above first image, the user can set that the target resolution of each of the target sub-images, wherein the respective target sub-images can be stitched to obtain the second image obtained after transcoding the above first image, that is, the target resolution of each of the sub-images desired by the user can be determined.

In this way, when determining the initial resolution of each initial sub-image, the preset target resolution of each of the transcoded target sub-image can be determined first.

Furthermore, for each determined target resolution, the initial resolution corresponding to the target resolution can be determined based on the first proportion of the target resolution in the preset resolution and the specified resolution of the first image as the initial resolution of the initial sub-image corresponding to the target resolution, the initial resolution of each of the to-be-transcoded initial sub-image is obtained.

Wherein a second proportion of each initial resolution in the specified resolution of the above first image is equal to the first proportion of the target resolution corresponding to the initial resolution in the preset resolution of the above second image. The target resolution corresponding to each initial sub-image is: the target resolution of the target sub-image after transcoding the initial sub-image.

That is to say, the second proportion of each initial resolution in the specified resolution of the first image is equal to the first proportion of the target resolution of the target sub-image after transcoding the initial resolution in the preset resolution of the second image.

Optionally, for each determined target resolution, the first proportion of the target resolution in the preset resolution can be calculated, and further, the product of the first proportion and the specified resolution of the first image can be calculated, and taking this product as the initial resolution of the initial sub-image corresponding to the target resolution.

For example, the specified resolution of the above first image is: a width of DW and a height of DH, and the preset resolution of the above second image is: a width of (W6+W7) and a height of H6; there are two target sub-images, moreover, the target resolutions of the two target sub-images respectively are: a width of W6, a height of H6; and a width of W7, a height of H6. Then it can be determined that the initial resolutions of the two initial sub-images respectively are: a width of W6/(W6+W7)*DW, a height of DH; and a width of W7/(W6+W7)*DW, a height of DH.

Of course, the above step S102 can further be performed in other ways, and this is not specifically limited in the embodiments of this application.

For example, while on the basis of ensuring that each initial resolution is not greater than the maximum resolution of the input data that can be supported by the above preset encoder, the target resolution of the target sub-image after transcoding each initial sub-image is not greater than the maximum resolution of the output data that can be supported by the above preset encoder, and the sum of all the target resolutions is the preset resolution of the second image after transcoding the first image, the initial resolution of each initial sub-image can be randomly determined. At this time, the determined initial resolution of each initial sub-image may not be exactly the same, thereby achieving irregular segmentation of the above first image.

Figure 3:
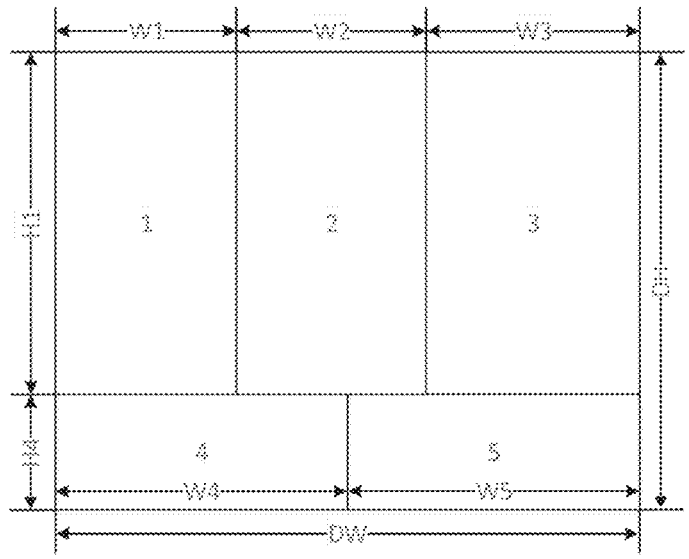
FIG. 3 is a schematic diagram of the initial resolutions of the respective initial images in an example.

For example, as shown in FIG. 3, the specified resolution of the above first image is: the width of DW, the height of DH, and the number of the respective initial sub-images is 5, then the determined initial resolution of the initial sub-image 1 is: the width of W1 and the height of H1; the initial resolution of the initial sub-image 2 is: the width of W2 and the height of H1; the initial resolution of the initial sub-image 3 is: the width of W3 and the height of H1; the initial resolution of the initial sub-image 4 is: the width of W4 and the height of H4; the initial resolution of the initial sub-image 5 is: the width of W5 and the height of H4.

S103: segmenting a to-be-cut image into respective to-be-transcoded initial sub-images based on respective initial resolutions;

after obtaining the initial resolution of each of the above initial sub-images, the above initial image can be segmented into a specified number of initial sub-images based on the respective initial resolutions.

Wherein, optionally, in a specific embodiment, the above step S103 may include the following step 21:

Step 21: based on the determined respective initial resolutions, segmenting the to-be-cut image into the respective to-be-transcoded initial sub-images without overlapping areas.

In this specific implementation, after obtaining the initial resolution of each of the above initial sub-images, the to-be-cut image can be segmented into the respective to-be-transcoded initial sub-images without overlapping areas based on the determined respective initial resolutions.

Wherein, since there is no overlapping area between the respective initial sub-images, and the respective initial sub-images may include all the image areas of the above first image, therefore, the sum of the initial initial resolutions of the respective initial sub-images is the specified resolution of the above first image.

For example, as shown in FIG. 3, the first image is divided into five initial sub-images according to the determined initial resolutions of the initial sub-images 1-5.

S104: encoding each initial sub-image according to a target resolution of a target sub-image obtained after transcoding this initial sub-image by using the preset encoder to obtain each of target code-streams.

After obtaining the respective initial sub-images, for each initial sub-image, the preset encoder can be used to encode this initial sub-image according to the target resolution of the target sub-image corresponding to the initial sub-image, to obtain the target code-stream for this initial sub-image.

Wherein, for each initial sub-image, after decoding the obtained target code-stream for the initial sub-image, the resolution of the obtained target sub-image is: the target resolution of the target sub-image obtained after transcoding the initial sub-image.

In this way, after encoding each of the above initial sub-images, each of the target code-streams can be obtained. That is, the number of obtained target code-streams is the same as that of the respective initial sub-images.

For example, the specified resolution of the above first image is: the width of DW and the height of DH, an initial sub-image a with an initial resolution: the width of W6/(W6+W7)*DW and the height of DH, as well as an initial sub-image b with an initial resolution: the width of W7/(W6+W7)*DW and the height of DH are obtained by segmenting the above first image. Moreover, the preset resolution of the above second image is: the width of (W6+W7) and the height of H6; the target resolution of a target sub-image obtained after transcoding the above initial sub-image a is: the width of W6 and the height of DH, the target resolution of a target sub-image after transcoding the above initial sub-image b is: the width of W7 and the height of DH.

In this way, the preset encoder can be used to encode the initial sub-image a with the resolution of width W6/(W6+W7)*DW and height DH according to the target resolution of width W6 and height DH, to obtain a target code-stream, and the preset encoder is used to encode the initial sub-image b with the resolution of width W7/(W6+W7)*DW and height DH according to the target resolution of width W7 and height DH to obtain a target code-stream.

After obtaining the above respective target code-streams, subsequent decoding, display, transmission, and storage processing can be performed on the above target code-streams.

Figure 4:
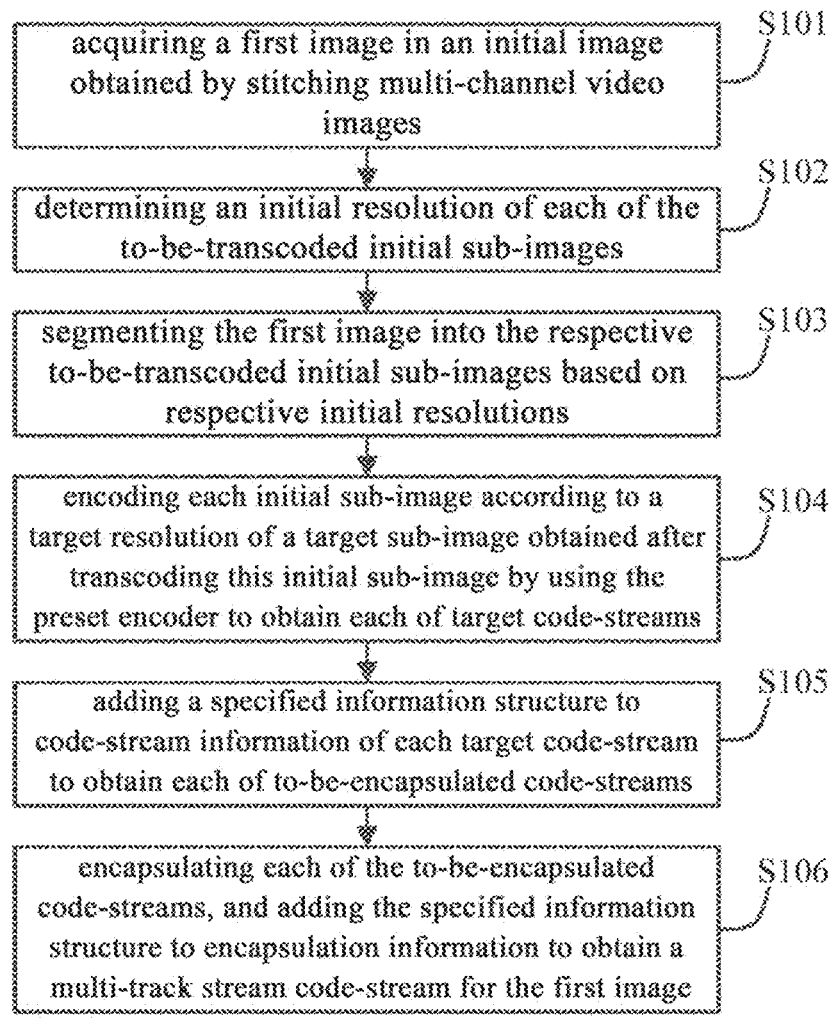
FIG. 4 is a schematic flow chart of another video transcoding method provided by an embodiment of the present application.

Optionally, in a specific embodiment, as shown in FIG. 4, an embodiment of the present application provides a video transcoding method, which includes the following steps S105-S106:

S105: adding a specified information structure to code-stream information of each target code-stream to obtain each of the to-be-encapsulated code-streams;

S106: encapsulating each of the to-be-encapsulated code-streams, and adding the specified information structure to encapsulation information to obtain a multi-track code-stream for the first image.

In this specific embodiment, after obtaining the respective target code-streams, the respective target code-streams can be transcoded to multi-track stream code-stream, wherein the number of tracks included in the multi-track stream code-stream is the number of the above target code-streams.

In this way, after obtaining each of the above target code-streams, first a specified information structure can be added to code-stream information of each target code-stream to obtain multi-channel to-be-encapsulated code-streams. Wherein each channel of target code-stream can be regarded as a naked stream of each track in the multi-track stream code-stream, then the specified information structure is added to the code-stream information of each channel of target code-stream to obtain multi-channel to-be-encapsulated code-streams. That is to say, the specified information structure is added to the naked stream information of each track's code-stream to obtain each of the naked streams to be encapsulated. Furthermore, each of the above code-streams to be encapsulated can be encapsulated, and the specified information structure can be added to the generated encapsulation information to obtain multi-track stream code-stream for the above first image. Wherein, the above specified information structure is MFI information structure.

Figure 5:
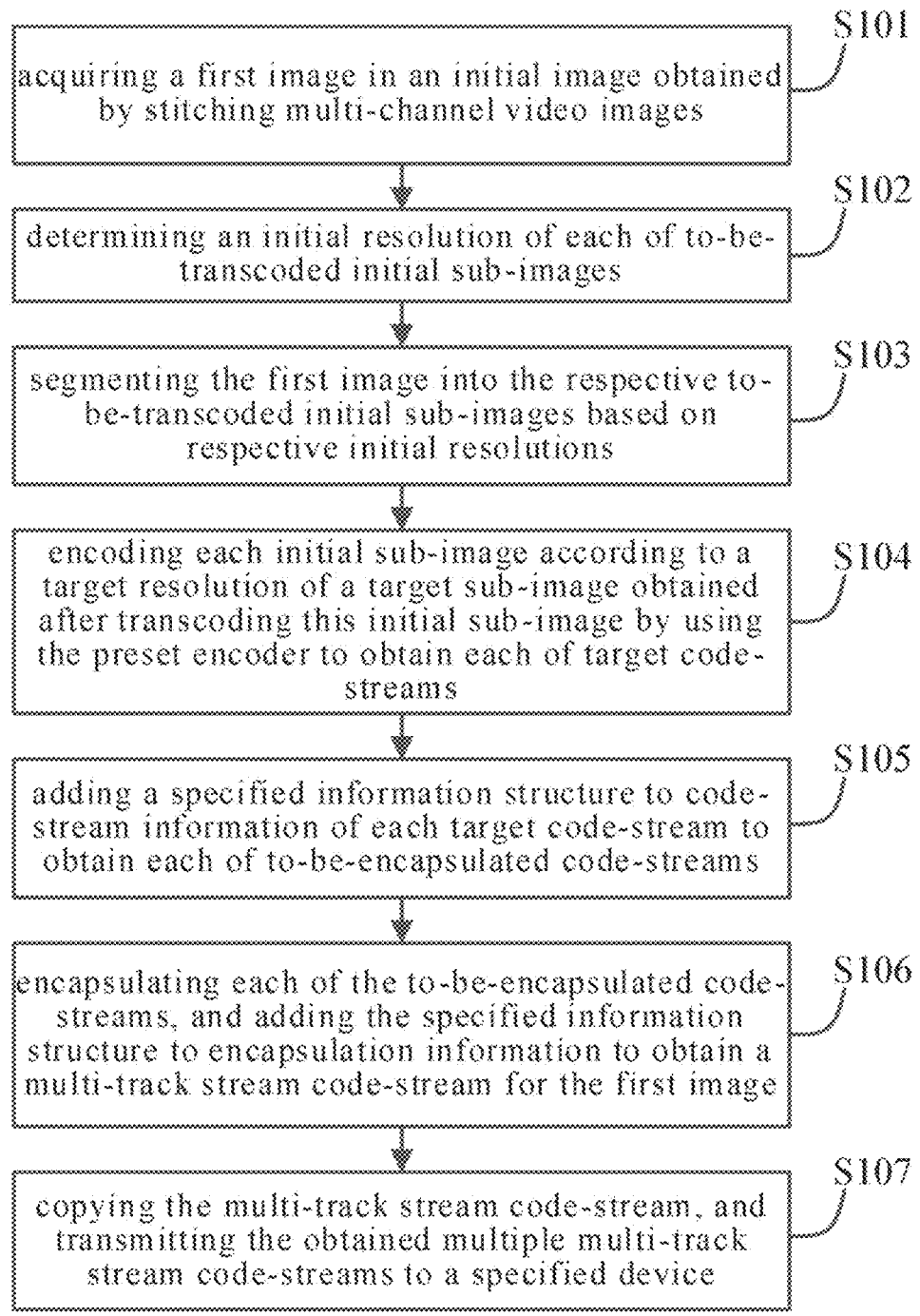
FIG. 5 is a schematic flow chart of another video transcoding method provided by an embodiment of the present application.

Optionally, in a specific implementation, as shown in FIG. 5, the video transcoding method provided by the embodiment of the present application may further include the following step S107:

S107: copying the multi-track stream code-stream and transmitting the obtained multiple multi-track stream code-streams to a specified device.

In this specific embodiment, after obtaining the above multi-track stream code-stream for the first image, there may be multiple users who wish to acquire the above multi-track stream code-stream. Therefore, the above multi-track stream code-stream can be copied, and the copied multiple multi-track stream code-streams are transmitted to a specified device(s). Wherein, the multiple copied multi-track stream code-streams can be transmitted to the same specified device, or the multiple copied multi-track stream code-streams can be transmitted to multiple different specified devices, both of which are reasonable.

It can be seen from the above that by applying the solution provided by the embodiment of the present application, when transcoding the video screen after stitching multi-channel video images, for each initial sub-image, since the initial sub-image is encoded based on the target resolution of the target sub-image after transcoding the initial sub-image. Therefore, after decoding the decoded target code-stream, the resolution of the resulting target sub-image is the above target resolution. Furthermore, since the sum of all the target resolutions is the preset resolution of the second image obtained after transcoding the first image, then, after decoding each of the target code-streams, the sum of resolutions of the respective target sub-images is also the above preset resolution. Therefore, the above first image can be transcoded, so that the resolution of the decoded second image displayed can meet the user needs.

In addition, by applying the solution provided by the embodiment of the present application, by encoding multiple initial sub-images to complete the transcoding of the above first image, it is possible to avoid the limitation on the maximum resolution of input data and the maximum resolution of output data that can be supported by the preset encoder when encoding the entire first image. Moreover, since the number of multiple target sub-images may not be equal to that of multi-channel video images stitched to obtain the above initial image, it is possible to avoid the limitation that the preset resolution of the transcoded target image must be an integral multiple of the number of the above multi-channel video images when encoding the multi-channel video images obtained by stitching the above initial image. In this way, the above first image can be transcoded more flexibly.

Usually, the encoder has a byte alignment requirement for the resolution of the input data, that is, the encoder can only encode the initial sub-image with the initial resolution meeting the byte alignment requirement.

For example, the encoder requires n-byte alignment, i.e. the encoder can only encode initial sub-images with the initial resolution of a multiple of n.

Figure 6:
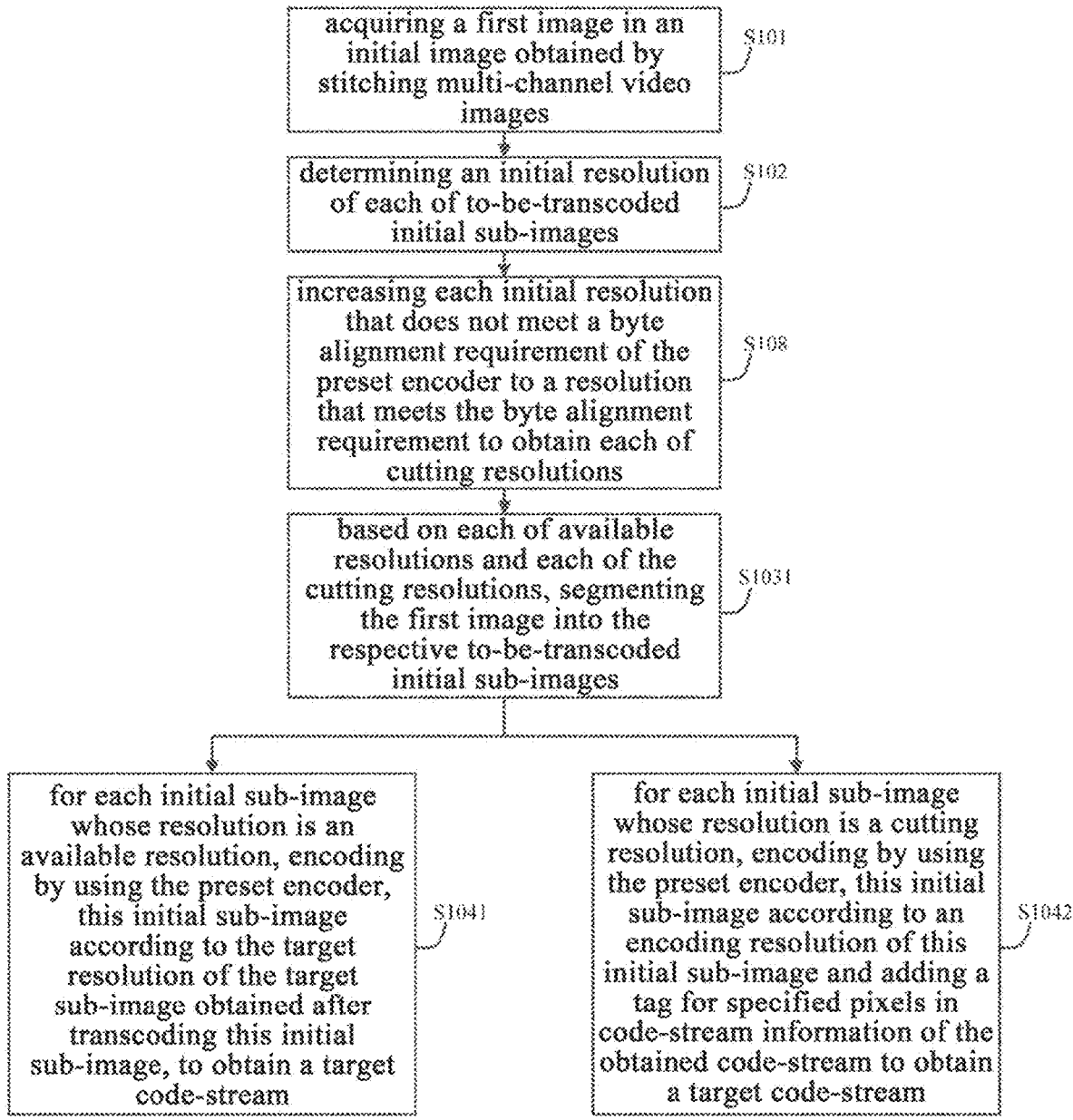
FIG. 6 is a schematic flow chart of another video transcoding method provided by an embodiment of the present application.

Based on this, optionally, in a specific embodiment, as shown in FIG. 6, the video transcoding method provided by the embodiment of the present application may further include the following step S108:

S108: increasing each initial resolution that does not meet a byte alignment requirement of the preset encoder to a resolution that meets the byte alignment requirement to obtain each of cutting resolutions.

In this specific embodiment, after obtaining the initial resolutions of the respective initial sub-images, for each initial resolution, it can be determined whether the initial resolution meets the byte alignment requirement of the above preset encoder.

Wherein when it is determined that the initial resolution does not meet the above byte alignment requirement, byte padding can be performed on the initial resolution, that is, the initial resolution is increased to a resolution that meets the byte alignment requirement, and the resulting resolution after byte padding is used as a cutting resolution of this initial sub-image.

Optionally, when it is determined that the initial resolution does not meet the above byte alignment requirement, the initial resolution can be increased to a resolution that has the smallest gap with the initial resolution and meets the byte alignment requirement.

For example, the preset encoder requires 8-byte alignment, and a certain initial resolution is: the width of 15 and the height of 16, then the initial resolution can be increased to the width of 16 and the height of 16, to obtain the cutting resolution.

In this way, after obtaining the initial resolution of each of the initial sub-images, each initial resolution that does not meet the byte alignment requirement of the preset encoder can be increased to a resolution that meets the byte alignment requirement to obtain each of the cutting resolutions.

Correspondingly, in this specific embodiment, the above step S103, segmenting the first image into respective to-be-transcoded initial sub-images based on respective initial resolutions, which may include the following step S1031:

S1031: based on each of available resolutions and each of the cutting resolutions, segmenting the first image into the respective to-be-transcoded initial sub-images.

Wherein the available resolution is an initial resolution that meets the byte alignment requirement; the respective initial sub-images include: initial sub-images with overlapping areas.

An initial resolution among the initial resolutions of the respective initial sub-images that meets the byte alignment requirement of the above preset encoder can be used as an available resolution. In this way, after obtaining the above cutting resolutions, segmenting the first image into the respective to-be-transcoded initial sub-images based on each of the available resolutions and each of the cutting resolutions.

Wherein, since the sum of the initial resolutions of each of the initial sub-images is the specified resolution of the above first image, and each of the cutting resolutions is obtained by increasing the initial resolution, therefore, the sum of the respective available resolutions and the respective cutting resolutions is greater than the specified resolution of the first image above. Furthermore, when segmenting the first image into the respective to-be-transcoded initial sub-images based on each of the available resolutions and each of the cutting resolutions, the resulting respective initial sub-images include all image areas of the above first image, and the resolution of the image obtained by stitching the respective initial sub-images is greater than the resolution of the above first image, that is, the size of the image obtained by stitching the respective initial sub-images is larger than that of the above first image, then, the resulting respective initial sub-images includes: initial sub-images with overlapping areas.

Correspondingly, in this specific embodiment, the above step S104, encoding each initial sub-image according to a target resolution of a target sub-image obtained after transcoding this initial sub-image by using the preset encoder to obtain each of target code-streams may include the following steps S1041-S1042:

S1041: for each initial sub-image whose resolution is an available resolution, encoding by using the preset encoder, this initial sub-image according to the target resolution of the target sub-image obtained after transcoding this initial sub-image, to obtain a target code-stream;

S1042: for each initial sub-image whose resolution is a cutting resolution, encoding by using the preset encoder, this initial sub-image according to an encoding resolution of this initial sub-image and adding a tag for specified pixels in code-stream information of the obtained code-stream to obtain a target code-stream;

wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

In this specific embodiment, for each initial sub-image, it can be first determined whether the resolution of the initial sub-image is an available resolution that meets the above byte alignment requirement, or a cutting resolution obtained by increasing the initial resolution.

In this way, for each initial sub-image whose resolution is an available resolution, the preset encoder can be used to encode the initial sub-image according to the target resolution of the target sub-image corresponding to the initial sub-image to obtain a target code-stream.

For each initial sub-image whose resolution is a cutting resolution, since the image area composed of some pixels in the initial sub-image is obtained by increasing the initial resolution of the initial sub-image, thereby when encoding the initial sub-image by using the preset encoder, the encoding resolution is obtained by increasing the target resolution of the target sub-image obtained after transcoding the initial sub-image.

In this way, for the convenience of description, for each initial sub-image whose resolution is a cutting resolution, a code-stream obtained by encoding according to the target resolution of the target sub-image after transcoding the initial sub-image is called a reference code-stream, and an image obtained by decoding the reference code-stream is called a reference image; and the initial sub-image is encoded according to the encoding resolution to obtain a target code-stream, and an image obtained by decoding the target code-stream is the target sub-image after transcoding the initial sub-image. Wherein, since the encoding resolution is obtained by increasing the target resolution, there is an image area obtained by increasing the reference image in the target sub-image. When stitching the above target sub-images to obtain the above second image, for the image area obtained by increasing the reference image in the above target sub-image, it is necessary to overlap the image area with other target sub-images including the image area, or to cut this image area off.

Based on this, for each initial sub-image image area whose resolution is a cutting resolution, it can be determined that when encoding the initial sub-image by using the above preset encoder, the used encoding resolution is the encoding resolution for determining the initial sub-image.

Wherein, the encoding resolution is: the product of the target resolution of the target sub-image after transcoding the initial sub-image and the specified multiple, and the specified multiple is: the ratio of the cutting resolution of the initial sub-image to the cutting resolution of the initial sub-image.

Optionally, for each initial sub-image whose resolution is a cutting resolution, first calculating the ratio of the cutting resolution of the initial sub-image to the initial resolution of the initial sub-image, and then calculating the product of the target resolution of the target sub-image after transcoding the initial sub-image and the above ratio, to obtain the encoding resolution.

For each initial sub-image whose resolution is a cutting resolution, after determining the encoding resolution of the initial sub-image, the preset encoder can be used to encode the initial sub-image according to the encoding resolution. Furthermore, in order to subsequently facilitate the overlapping or cutting of the image area obtained by the above increasing in the target sub-image after the addition of the initial sub-image, a tag for specified pixels can be added to the code-stream information of the encoded code-stream, to obtain the target code-stream.

Wherein, the above specified pixels are: added pixels in the target sub-image after transcoding the initial sub-image when the target resolution of the target sub-image obtained after transcoding the initial sub-image is increased to the above encoding resolution.

That is to say, the specified pixels can be understood as pixels corresponding to the difference between the encoding resolution of the initial sub-image and the target resolution of the target sub-image after transcoding the initial sub-image.

Optionally, the above tag for the specified pixels may be: the difference between the encoding resolution of the initial sub-image and the target resolution of the target sub-image after transcoding the initial sub-image.

For example, the above preset encoder requires 8-byte alignment, and the initial resolution of a certain initial sub-image is: the width of 15 and the height of 16, the target resolution of the target sub-image after transcoding the initial sub-image is: the width of W8 and the height if H8, then the initial resolution can be increased to: the width of 16 and the height of 16 to obtain the cutting resolution. Then, according to the above cutting sub-resolution, the initial sub-image is obtained by cutting. Based on this, when transcoding the initial sub-image, the encoding resolution of the initial sub-image is first determined to be: the width of W8*16/15 and the height of H8. Then the preset encoder can be used to encode the above initial sub-image according to the encoding resolution of the width of W8*16/15 and the height of H8, and a tag for the specified pixels is added in the resulting code-stream, to obtain the target code-stream. Wherein, the above specified pixels are: added pixels in the above target sub-image when the target resolution of the width of W8 and the height of H8 is increased to the encoding resolution of the width of W8*16/15 and the height of H8, therefore, the resolution of the image area composed of the above specified pixels is: the width of W8*16/15−W8 and the height of H8, then the above added tag for the specified pixels can be: W8*16/15−W8.

For each initial sub-image whose resolution is a cutting resolution, since the cutting resolution used when segmenting to obtain an initial sub-image, is greater than the determined initial resolution of the initial sub-image, and when encoding the initial sub-image, the encoding resolution as used is greater than the target resolution of the target sub-image after transcoding the initial sub-image. Therefore, before encoding the initial sub-image, it is necessary to first determine whether the cutting resolution of the initial sub-image meets the resolution limitation of the above preset encoder for the input data, and whether the encoding resolution of the initial sub-image meets the resolution limit of the above preset encoder for the output data.

Figure 7:
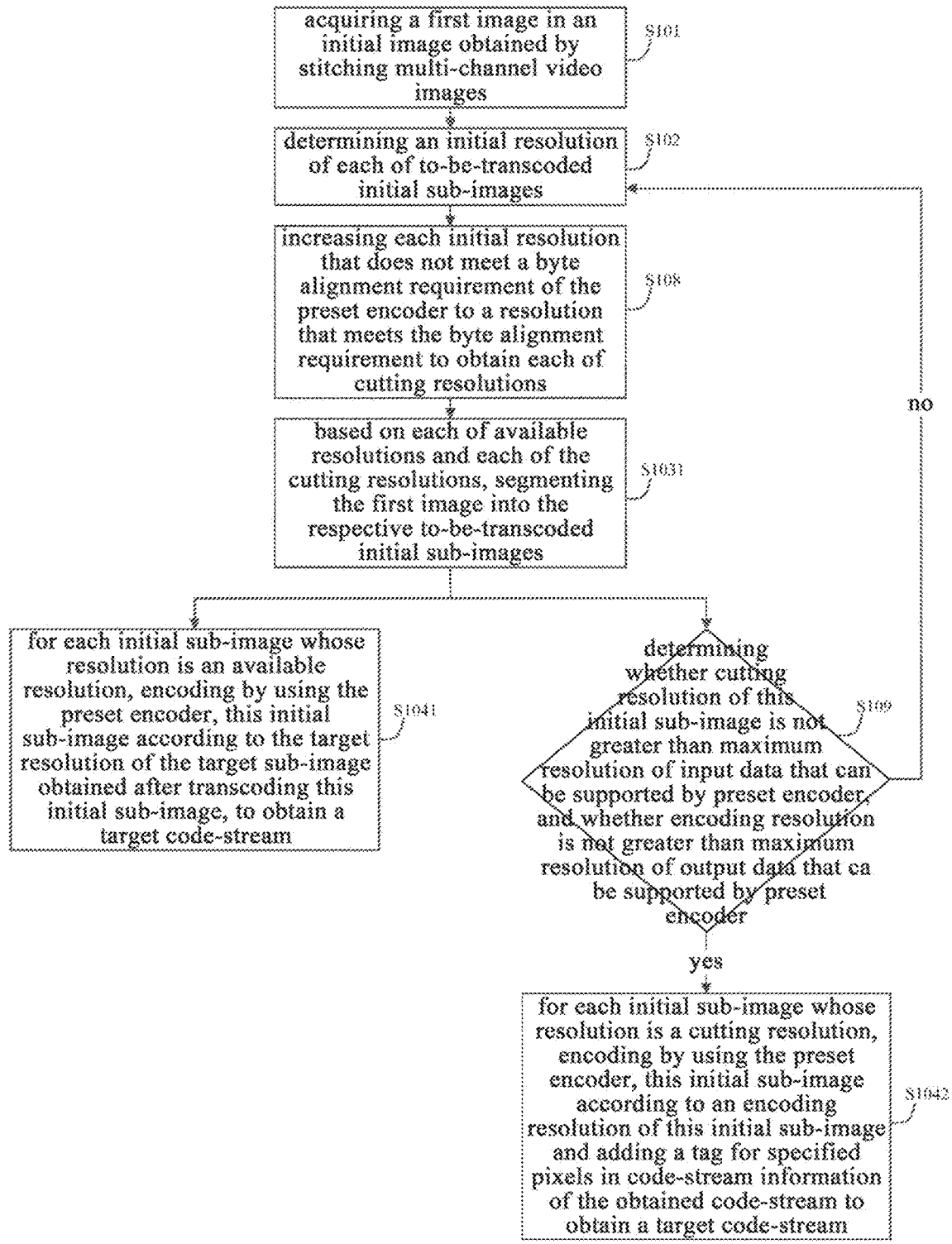
FIG. 7 is a schematic flow chart of another video transcoding method provided by an embodiment of the present application.

Based on this, optionally, in a specific embodiment, as shown in FIG. 7, the video transcoding method provided by the embodiment of the present application may further include the following step S109:

S109: determining whether the cutting resolution of this initial sub-image is not greater than the maximum resolution of the input data that can be supported by the preset encoder, and whether the encoding resolution of the initial sub-image is not greater than the maximum resolution of the output data that can be supported by the preset encoder; if yes, executing the above step S1042; otherwise, returning to the above step S102.

In this specific embodiment, for each initial sub-image whose resolution is a cutting resolution, the initial sub-image with the cutting resolution is obtained by cutting, and the encoding resolution of this initial sub-image is determined, it can be first determined whether the cutting resolution of the initial sub-image is not greater than the maximum resolution of the input data that can be supported by the above preset encoder, and whether the encoding resolution of the initial sub-image is not greater than the maximum resolution of the output data that can be supported by the preset encoder.

Wherein, after it is determined that the cutting resolution of the initial sub-image is not greater than the maximum resolution of the input data that can be supported by the above preset encoder, and the encoding resolution of the initial sub-image is not greater than the maximum resolution of the output data that can be supported by the above preset encoder, continuing to use the above preset encoder to encode the initial sub-image according to the encoding resolution of the initial sub-image, and adding a tag for the specified pixels in code-stream information of the resulting code-stream to obtain the target code-stream.

Correspondingly, when it is determined that the cutting resolution of the initial sub-image is greater than the maximum resolution of the input data that can be supported by the above preset encoder, and/or the encoding resolution of the initial sub-image is greater than the maximum resolution of the output data that can be supported by the above preset encoder, since the cutting resolution of the initial sub-image does not meet the resolution limitation of the above preset encoder for the input data, and/or the encoding resolution of the initial sub-image does not meet the resolution limitation of the above preset encoder for the output data. Therefore, the above preset encoder cannot encode the initial sub-image. Therefore, the initial resolution of each initial sub-image can be re-determined, so that the subsequent video transcoding method is executed according to the re-determined initial resolution of each initial sub-image.

Corresponding to the above video transcoding method provided by the embodiments of the present application, an embodiment of the present application further provides a video display method.

Wherein, the method is suitable for any application scenario that requires transcoding an image in a video image obtained by stitching multi-channel video screens, such as factory scenario, road traffic scenario, etc. Moreover, the method can be applied to any electronic device that can transcode a video screen to obtain a video code-stream, for example, a capture device with image processing function, a server that is communicatively connected to the capture device, a display device that is communicatively connected to the capture device, etc. Based on this, the embodiments of the present application do not specifically limit the application scenarios and execution subjects of this method.

Furthermore, the execution subject of the video transcoding method provided by the embodiments of the present application may be the same as that of the video display method provided by the embodiment of the present application, or may be different.

Figure 8:
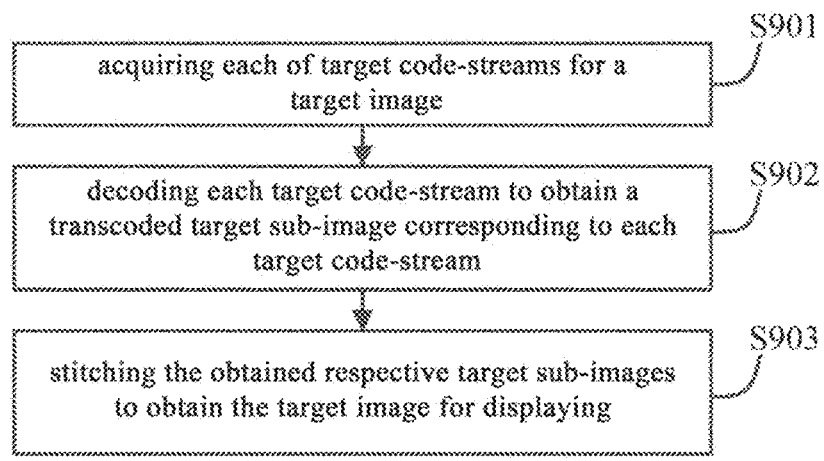
FIG. 8 is a schematic flowchart of a video display method provided by an embodiment of the present application.

FIG. 8 is a schematic flowchart of a video display method provided by an embodiment of the present application, as shown in FIG. 8, the method may include the following steps:

S901: acquiring each of target code-streams for a target image;
wherein each of the target code-streams is obtained based on any of the video transcoding methods provided by the embodiments of the present application;
S902: decoding each target code-stream to obtain a transcoded target sub-image corresponding to each target code-stream;
optionally, in a specific embodiment, the above step S902 may include the following steps 31-33:
Step 31: for each target code-stream, detecting whether there is a tag for specified pixels in the target code-stream; if so, performing step 32; if not, performing step 33;
Step 32: decoding the target code-stream, and cutting off an image area corresponding to the specified pixels from the decoded image to obtain the transcoded target sub-image corresponding to the target code-stream;
Step 33: decoding the target code-stream to obtain the transcoded target sub-image corresponding to the target code-stream.

In this specific embodiment, for a certain target code-stream, the target code-stream can be obtained by encoding according to the above specified resolution. Therefore, in the image obtained after decoding the target code-stream, there is an image area that needs to be overlapped with other target sub-images including the image area or be cut off, and there is a tag for specified pixels in the target code-stream, wherein the specified pixels are added pixels in the target sub-image corresponding to the initial sub-image when the target resolution of the target sub-image corresponding to the initial sub-image is increased to the specified resolution, that is, the above image area that needs to be overlapped or be cut off is tagged in the target code-stream.

In this way, for each target code-stream, it can first be detected whether there is a tag for the specified pixel in the target code-stream.

Wherein, if it is detected that there is a tag for the specified pixels in the target code-stream, the target code-stream can be decoded, and the image area corresponding to the specified pixel in the decoded image can be cut off to obtain the transcoded target sub-image corresponding to the target code-stream.

If it is detected that there is no tag for the specified pixels in the target code-stream, the target code-stream can be decoded directly to obtain the transcoded target sub-image corresponding to the target code-stream.

S903: stitching the obtained respective target sub-images to obtain the target image for displaying.

When stitching multi-channel video to obtain a stitched display video screen, each of the target code-streams can be obtained based on any of the video transcoding methods provided by the above embodiments of the present application. Furthermore, each of the target code-streams can be decoded to obtain the target sub-image corresponding to each target code-stream. In this way, the resulting target sub-images can be stitched to obtain the target image for displaying.

Wherein, optionally, when each of the target code-streams obtained above is a multi-track stream code-stream, the resulting each target code-stream can be decoded according to the stitching method of the video screen corresponding to the above multi-track stream code-stream to obtain the target sub-image corresponding to each target code-stream, and the resulting target sub-images each are stitched to obtain the target image for displaying.

It can be seen from the above that by applying the solution provided by the embodiment of the present application, on the basis of realizing the transcoding of the video screen after stitching the multi-channel video screens so that the resolution of the decoded video screen displayed can meet the user needs, each of the resulting target code-streams can be decoded and stitched to obtain a video screen with a resolution that meets the user needs.

Corresponding to the above video transcoding method provided by the embodiments of the present application, an embodiment of the present application further provides a video transcoding apparatus.

Figure 9:
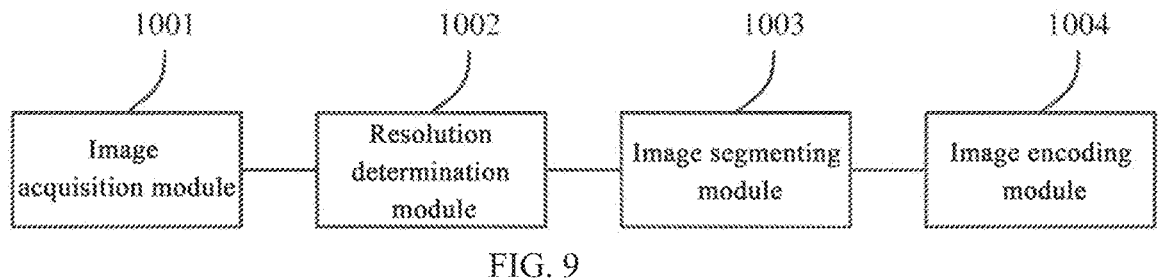
FIG. 9 is a schematic structural diagram of a video transcoding apparatus provided by an embodiment of the present application.

FIG. 9 is a schematic structural diagram of a video transcoding apparatus provided by an embodiment of the present application, as shown in FIG. 9, the apparatus may include the following modules:

an image acquisition module 1001, configured to acquire a first image in an initial images obtained by stitching multi-channel video images;

a resolution determination module 1002, configured used to determine an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and the sum of all target resolutions is a preset resolution of the second image after transcoding the first image;

an image segmenting module 1003, configured to segment a to-be-cut image into respective to-be-transcoded initial sub-images based on respective initial resolutions;

an image encoding module 1004, configured to encode each initial sub-image according to a target resolution of a target sub-image obtained after transcoding this initial sub-image by using the preset encoder to obtain each of target code-streams.

It can be seen from the above that by applying the solution provided by the embodiments of the present application, when transcoding the video screen after stitching multi-channel video images, the encoder for transcoding can be preset according to the user's needs, it further be determined the maximum resolutions of input data and output data that can be supported by the preset encoder.

In this way, after acquiring the to-be-transcoded initial image obtained by stitching multi-channel video images, firstly the to-be-transcoded first image can be acquired from the initial image. Furthermore, the initial resolution of each of the to-be-transcoded initial sub-image obtained by segmenting the first image can be determined. Wherein each initial resolution is not greater than the maximum resolution of the input data that can be supported by the above preset encoder, and the target resolution of the target sub-image obtained after encoding each initial sub-image is not greater than the maximum resolution of the output data that can be supported by the above preset encoder, and the sum of all the target resolutions is the preset resolution of the second image after transcoding the first image. After that, encoding the initial sub-image according to the target resolution of the target sub-image after transcoding each initial sub-image by using the preset encoder, in order to obtain each of target code-streams.

For each initial sub-image, since the initial sub-image is encoded based on the target resolution of the target sub-image after transcoding the initial sub-image, after decoding the decoded target code-stream, the resolution of the resulting target sub-image is the above target resolution. Furthermore, since the sum of all the target resolutions is the preset resolution of the second image after transcoding the first image, then, after decoding each of the target code-streams, the sum of the resolutions of the respective target sub-images is also the above preset resolution. Therefore, transcoding the first image can be achieved, so that the resolution of the decoded second image displayed can meet the user needs.

In addition, the solution provided by the embodiments of the present application is applied, by encoding multiple initial sub-images, transcoding the above first image is completed, it is possible to avoid the limitation of the maximum resolutions of input data and output data that can be supported by the preset encoder when encoding the entire first image. Moreover, since the number of multiple target sub-images may not be equal to that of multi-channel video images stitched to obtain the above initial image, it is possible to avoid the limitation that the preset resolution of the transcoded target image must be an integral multiple of the number of the above multi-channel video images when encoding the multi-channel video images obtained by stitching the above initial image. In this way, the above first image can be transcoded more flexibly.

Optionally, in a specific embodiment, the apparatus further includes: a code-stream encapsulation module, configured to add a specified information structure to code-stream information of each target code-stream to obtain each of to-be-encapsulated code-streams; and encapsulate each of the to-be-encapsulated code-streams, and add the specified information structure to encapsulation information to obtain a multi-track stream code-stream for the first image.

Optionally, in a specific embodiment, the apparatus further includes: a code-stream copying module, configured to copy the multi-track stream code-stream, and transmit the obtained multiple multi-track stream code-streams to a specified device.

Optionally, in a specific embodiment, the resolution determination module 1002 is specifically configured to: determine a preset target resolution of each of the target sub-images obtained after transcoding; for each target resolution, based on a first proportion of the target resolution in the preset resolution and a specified resolution of the first image, determine an initial resolution corresponding to the target resolution as an initial resolution of the initial sub-image corresponding to the target resolution; wherein a second proportion of each initial resolution in the specified resolution is the same as the first proportion of the target resolution corresponding to the initial resolution in the preset resolution.

Optionally, in a specific embodiment, the image segmenting module 1003 is specifically configured to: based on the determined respective initial resolutions, segment the to-be-cut image into the respective to-be-transcoded initial sub-images without overlapping areas.

Optionally, in a specific embodiment, the apparatus further includes: a resolution changing module, configured to
increase each initial resolution that does not meet a byte alignment requirement of the preset encoder to a resolution that meets the byte alignment requirement to obtain each of the cutting resolutions, before segmenting a to-be-cut image into respective to-be-transcoded initial sub-images based on respective initial resolutions;

the image segmenting module 1003 is specifically configured to: segment the first image into the respective to-be-transcoded initial sub-images based on each of available resolutions and each of the cutting resolutions; wherein the available resolution is an initial resolution that meets the byte alignment requirement; wherein the respective initial sub-images comprise initial sub-images with overlapping areas;

the image encoding module 1004 is specifically configured to: for each initial sub-image whose resolution is an available resolution, encode by using the preset encoder, this initial sub-image according to the target resolution of the target sub-image obtained after transcoding the initial sub-image, to obtain a target code-stream; for each initial sub-image whose resolution is a cutting resolution, encode by using the preset encoder, this initial sub-image according to an encoding resolution of this initial sub-image and add a tag for specified pixels in code-stream information of the obtained code-stream to obtain a target code-stream;

wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

Optionally, in a specific embodiment, the apparatus further includes: a resolution changing module, configured to determine, before encoding by using the preset encoder, this initial sub-image according to an encoding resolution of this initial sub-image, whether the cutting resolution of this initial sub-image is not greater than the maximum resolution of the input data that can be supported by the preset encoder, and whether the encoding resolution of this initial sub-image is not greater than the maximum resolution of the output data that can be supported by the preset encoder; if so, trigger the image encoding module 1004, otherwise, trigger the resolution determination module 1002.

Corresponding to the above video display method provided by the embodiments of the present application, an embodiment of the present application also provides a video display apparatus.

Figure 10:
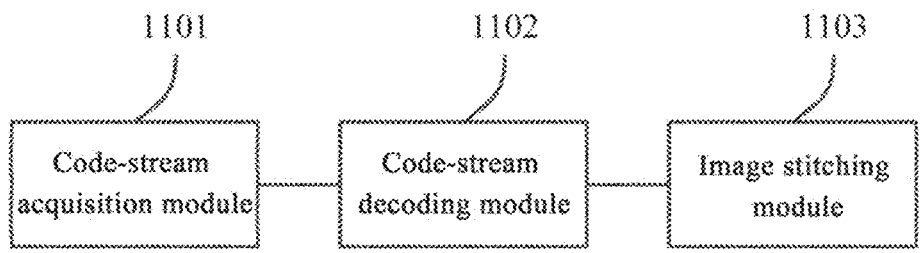
FIG. 10 is a schematic structural diagram of a video display apparatus provided by an embodiment of the present application.

FIG. 10 is a schematic structural diagram of a video display apparatus provided by the embodiment of the present application, as shown in FIG. 10, the apparatus may include the following modules:
- a code-stream acquisition module 1101, configured to acquire each of target code-streams for a target image; wherein each of target code-streams is obtained based on any one of the video transcoding methods provided by the embodiments of the present application;
- a code-stream decoding module 1102, configured to decode each target code-stream to obtain a transcoded target sub-image corresponding to each target code-stream;
- an image stitching module 1103, configured to stitch the obtained respective target sub-images to obtain the target image for displaying.

It can be seen from the above that by applying the solution provided by the embodiments of the present application, on the basis of realizing the transcoding of the video screen after stitching the multi-channel video screens, so that the resolution of the decoded video screen displayed can meet the user needs, each of the resulting target code-streams can be decoded and stitched to obtain a video screen with a resolution that meets the user needs.

Optionally, in a specific embodiment, the code-stream decoding module 1102 is specifically configured to: for each target code-stream, detect whether there is a tag for specified pixels in the target code-stream; if so, decode the target code-stream, and cut off an image area corresponding to the specified pixels in the decoded image to obtain the transcoded target sub-image corresponding to the target code-stream; if not, decode the target code-stream to obtain the transcoded target sub-image corresponding to the target code-stream.

Figure 11:
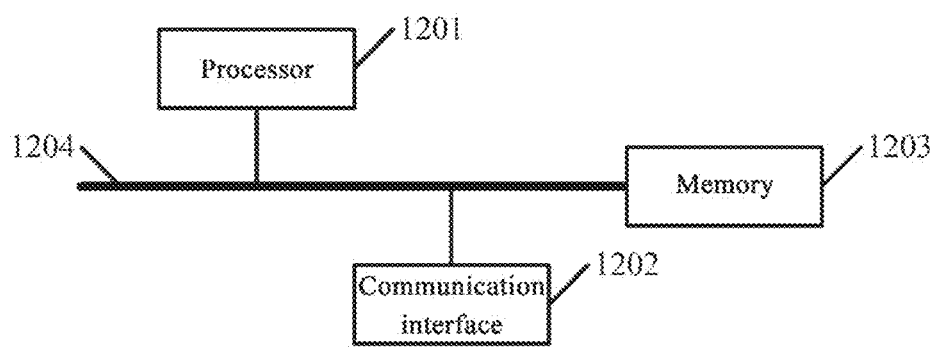
FIG. 11 is a schematic structural diagram of an electronic device provided by an embodiment of the present application.

Corresponding to the video transcoding method and the video display method provided by the above embodiments of the present application, an embodiment of the present application also provides an electronic device, as shown in FIG. 11, including a processor 1201, a communication interface 1202, and a memory 1203 and communication bus 1204, wherein the processor 1201, communication interface 1202, and memory 1203 communicate with each other through the communication bus 1204. The memory 1203 is configured to store a computer program; the processor 1201 is configured to implement the video transcoding method provided by the above embodiments of the present application, and/or, the video display method provided by the above embodiments of the present application when executing the program stored in the memory 1203.

The communication bus mentioned in the above-mentioned electronic device can be a PCI (Peripheral Component Interconnect) bus or an EISA (Extended Industry Standard Architecture) bus, etc. The communication bus can be divided into address bus, a data bus, a control bus, and the like. For ease of indication, only one thick line is used in the figure, but it does not mean that there is only one bus or one type of bus.

The communication interface is used for communication between the above-mentioned electronic device and other devices.

The memory may include RAM (Random Access Memory) or NVM (Non-Volatile Memory), such as at least one disk memory. Optionally, the memory may also be at least one storage apparatus located far away from the aforementioned processor.

The above-mentioned processor can be a general-purpose processor, including a CPU (Central Processing Unit), an NP (Network Processor), etc.; it can also be a DSP (Digital Signal Processing), an ASIC (Application Specific Integrated Circuit), an FPGA (Field-Programmable Gate Array) or other programmable logic devices, discrete gate or transistor logic devices, and discrete hardware components.

An embodiment of the present application further provides a computer-readable storage medium, which stores a computer program thereon, wherein when the computer program is executed by a processor, the computer program carries out any one of the video transcoding methods provided by the above embodiments of the present application, and/or, the video display method provided by the above embodiments of the present application.

In yet another embodiment provided by the present application, a computer program product including instructions is also provided, which, when running on a computer, causes the computer to carry out any one of the video transcoding methods provided by the above embodiments of the present application, and/or, the video display method provided by the above embodiments of the present application.

In the above embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general purpose computer, special purpose computer, computer network, or other programmable device. The computer instructions may be stored in a computer readable storage medium or transmitted from one computer readable storage medium to another computer readable storage medium, for embodiment, the computer instructions may be transmitted from a website, computer, server or data center to another website, computer, server, or data center by wire (such as coaxial cable, fiber optic, digital subscriber line) or wirelessly (such as infrared, wireless, microwave, etc.). The computer-readable storage medium may be any usable medium that can be accessed by a computer or a data storage device such as a server and a data center and the like that includes an integration of one or more available media. The usable media may be magnetic media (such as a floppy disk, a hard disk, a magnetic tape), optical media (such as DVD), or semiconductor media (such as Solid State Disk (SSD)) and the like.

It should be noted that, here such as first and second and the like herein are only used to distinguish one entity or operation from another and do not necessarily require or imply any such actual relationship or order between these entities or operations. Moreover, the terms "comprising", "including" or any other variations thereof are intended to encompass a non-exclusive inclusion such that a process, method, article or device that includes a series of elements includes not only those elements, but also includes other elements not explicitly listed or other elements inherent to such a process, method, article or apparatus. Without further limitation, elements defined by the phrase "comprising one . . . " do not preclude the presence of additional identical elements in a process, method, article or device that includes the mentioned elements.

The various embodiments in this specification are described in a related manner. Each embodiment focuses on the differences from other embodiments, and the same and similar parts between the various embodiments can be referred to each other. Especially, for the embodiments of the apparatus, the electronic device, the computer-readable storage medium, and the computer program product, the description is relatively simple because it is basically similar to the embodiment of the method, and the relevant points can be referred to the partial description of the embodiment of the method.

The above descriptions are only preferred embodiments of the present application, and are not intended to limit the present application. Any modifications, equivalent replacements, improvements and the like made within the spirit and principles of the present application shall be included within the scope of protection of the present application.

The invention claimed is:

1. A video transcoding method comprising:
acquiring a first image in an initial image obtained by stitching multi-channel video images as a to-be-cut image;
determining an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and a sum of all target resolutions is a preset resolution of a second image obtained after transcoding the first image; wherein determining the initial resolution of each of to-be-transcoded initial sub-images comprises: determining a preset target resolution of each of the target sub-images obtained after transcoding; for each target resolution, based on a first proportion of the target resolution in the preset resolution and a specified resolution of the first image, determining an initial resolution corresponding to the target resolution as an initial resolution of an initial sub-image corresponding to the target resolution; wherein a second proportion of each initial resolution in the specified resolution is the same as the first proportion of the target resolution corresponding to the initial resolution in the preset resolution;
segmenting the to-be-cut image into respective to-be-transcoded initial sub-images based on respective initial resolutions;
encoding each initial sub-image according to a target resolution of a target sub-image obtained after transcoding this initial sub-image by using the preset encoder to obtain each of target code-streams.

2. The method according to claim 1, further comprising:
adding a specified information structure to code-stream information of each target code-stream to obtain each of to-be-encapsulated code-streams;
encapsulating each of the to-be-encapsulated code-streams, and adding the specified information structure to encapsulation information to obtain a multi-track stream code-stream for the first image.

3. The method according to claim 2, wherein, segmenting the to-be-cut image into respective to-be-transcoded initial sub-images based on respective initial resolutions comprises:
based on the determined respective initial resolutions, segmenting the to-be-cut image into the respective to-be-transcoded initial sub-images without overlapping areas.

4. The method according to claim 2, wherein before segmenting the to-be-cut image into respective to-be-transcoded initial sub-images based on respective initial resolutions, the method further comprises:
increasing each initial resolution that does not meet a byte alignment requirement of the preset encoder to a resolution that meets the byte alignment requirement to obtain each of cutting resolutions;
wherein segmenting the to-be-cut image into respective to-be-transcoded initial sub-images based on respective initial resolutions, comprises:
based on each of available resolutions and each of the cutting resolutions, segmenting the first image into the respective to-be-transcoded initial sub-images; wherein the available resolution is an initial resolution that meets the byte alignment requirement; wherein the respective initial sub-images comprise initial sub-images with overlapping areas;
wherein encoding each initial sub-image according to a target resolution of a target sub-image obtained after transcoding this initial sub-image by using the preset encoder to obtain each of target code-streams, comprises:
for each initial sub-image whose resolution is an available resolution, encoding by using the preset encoder, this initial sub-image according to the target resolution of the target sub-image obtained after transcoding this initial sub-image, to obtain a target code-stream;
for each initial sub-image whose resolution is a cutting resolution, encoding by using the preset encoder, this initial sub-image according to an encoding resolution of this initial sub-image and adding a tag for specified pixels in code-stream information of the obtained code-stream to obtain a target code-stream;
wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

5. The method according to claim 1, wherein, segmenting the to-be-cut image into respective to-be-transcoded initial sub-images based on respective initial resolutions comprises:
　based on the determined respective initial resolutions, segmenting the to-be-cut image into the respective to-be-transcoded initial sub-images without overlapping areas.

6. The method according to claim 1, wherein before segmenting the to-be-cut image into respective to-be-transcoded initial sub-images based on respective initial resolutions, the method further comprises:
　increasing each initial resolution that does not meet a byte alignment requirement of the preset encoder to a resolution that meets the byte alignment requirement to obtain each of cutting resolutions;
　wherein segmenting the to-be-cut image into respective to-be-transcoded initial sub-images based on respective initial resolutions, comprises:
　based on each of available resolutions and each of the cutting resolutions, segmenting the first image into the respective to-be-transcoded initial sub-images; wherein the available resolution is an initial resolution that meets the byte alignment requirement; wherein the respective initial sub-images comprise initial sub-images with overlapping areas;
　wherein encoding each initial sub-image according to a target resolution of a target sub-image obtained after transcoding this initial sub-image by using the preset encoder to obtain each of target code-streams, comprises:
　for each initial sub-image whose resolution is an available resolution, encoding by using the preset encoder, this initial sub-image according to the target resolution of the target sub-image obtained after transcoding this initial sub-image, to obtain a target code-stream;
　for each initial sub-image whose resolution is a cutting resolution, encoding by using the preset encoder, this initial sub-image according to an encoding resolution of this initial sub-image and adding a tag for specified pixels in code-stream information of the obtained code-stream to obtain a target code-stream;
　wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

7. The method according to claim 6, wherein before encoding by using the preset encoder, this initial sub-image according to an encoding resolution of this initial sub-image, the method further comprises:
　determining whether the cutting resolution of this initial sub-image is not greater than the maximum resolution of the input data that can be supported by the preset encoder, and whether the encoding resolution of this initial sub-image is not greater than the maximum resolution of the output data that can be supported by the preset encoder;
　if so, encoding by using the preset encoder, this initial sub-image according to the encoding resolution of this initial sub-image;
　otherwise, returning to the step of determining an initial resolution of each of the to-be-transcoded initial sub-images.

8. A video display method comprising:
　acquiring each of target code-streams for a target image; wherein each of the target code-streams is obtained based on the video transcoding method according to claim 1;
　decoding each target code-stream to obtain a transcoded target sub-image corresponding to each target code-stream;
　stitching the obtained respective target sub-images to obtain the target image for displaying.

9. The method according to claim 8, wherein decoding each target code-stream to obtain a transcoded target sub-image corresponding to each target code-stream, comprises:
　for each target code-stream, detecting whether there is a tag for specified pixels in the target code-stream;
　if so, decoding the target code-stream, and cutting off an image area corresponding to the specified pixels from the decoded image to obtain the transcoded target sub-image corresponding to the target code-stream;
　if not, decoding the target code-stream to obtain the transcoded target sub-image corresponding to the target code-stream.

10. An electronic device comprising a processor, a communication interface, a memory, and a communication bus, wherein the processor, the communication interface, and the memory communicate with each other through the communication bus;
　the memory is configured to store a computer program;
　the processor is configured to implement the method according to claim 9 when executing the program stored in the memory.

11. An electronic device comprising a processor, a communication interface, a memory, and a communication bus, wherein the processor, the communication interface, and the memory communicate with each other through the communication bus;
　the memory is configured to store a computer program;
　the processor is configured to implement the method according to claim 8 when executing the program stored in the memory.

12. An electronic device comprising a processor, a communication interface, a memory, and a communication bus, wherein the processor, the communication interface, and the memory communicate with each other through the communication bus;
　the memory is configured to store a computer program;
　the processor is configured to, when executing the program stored in the memory, implement the following operations:
　acquiring a first image in an initial image obtained by stitching multi-channel video images as a to-be-cut image;
　determining an initial resolution of each of to-be-transcoded initial sub-images; wherein each initial resolution is not greater than a maximum resolution of input data that can be supported by a preset encoder, and a target resolution of a target sub-image obtained after transcoding each initial sub-image is not greater than a maximum resolution of output data that can be supported by the preset encoder, and a sum of all target resolutions is a preset resolution of a second image obtained after transcoding the first image; wherein determining the initial resolution of each of to-be-transcoded initial sub-images comprises: determining a preset target resolution of each of the target sub-images obtained after transcoding; for each target resolution, based on a first proportion of the target resolution in the preset resolution and a specified resolution of the first image, determining an initial resolution corresponding to the target resolution as an initial resolution of an initial sub-image corresponding to the target resolution; wherein a second proportion of each initial resolution in the specified resolution is the same as the first proportion of the target resolution corresponding to the initial resolution in the preset resolution;

segmenting the to-be-cut image into respective to-be-transcoded initial sub-images based on respective initial resolutions;

encoding each initial sub-image according to a target resolution of a target sub-image obtained after transcoding this initial sub-image by using the preset encoder to obtain each of target code-streams.

13. The electronic device according to claim 12, wherein the processor is further configured to, when executing the program stored in the memory, implement the following operations:

adding a specified information structure to code-stream information of each target code-stream to obtain each of to-be-encapsulated code-streams;

encapsulating each of the to-be-encapsulated code-streams, and adding the specified information structure to encapsulation information to obtain a multi-track stream code-stream for the first image.

14. The electronic device according to claim 13, wherein the processor is further configured to, when executing the program stored in the memory, implement the following operations:

copying the multi-track stream code-stream, and transmitting the obtained multiple multi-track stream code-streams to a specified device.

15. The electronic device according to claim 12, wherein, segmenting the to-be-cut image into respective to-be-transcoded initial sub-images based on respective initial resolutions comprises:

based on the determined respective initial resolutions, segmenting the to-be-cut image into the respective to-be-transcoded initial sub-images without overlapping areas.

16. The electronic device according to claim 12, wherein before segmenting the to-be-cut image into respective to-be-transcoded initial sub-images based on respective initial resolutions, the processor is further configured to, when executing the program stored in the memory, implement the following operations:

increasing each initial resolution that does not meet a byte alignment requirement of the preset encoder to a resolution that meets the byte alignment requirement to obtain each of cutting resolutions;

wherein segmenting the to-be-cut image into respective to-be-transcoded initial sub-images based on respective initial resolutions, comprises:

based on each of available resolutions and each of the cutting resolutions, segmenting the first image into the respective to-be-transcoded initial sub-images; wherein the available resolution is an initial resolution that meets the byte alignment requirement; wherein the respective initial sub-images comprise initial sub-images with overlapping areas;

wherein encoding each initial sub-image according to a target resolution of a target sub-image obtained after transcoding this initial sub-image by using the preset encoder to obtain each of target code-streams, comprises:

for each initial sub-image whose resolution is an available resolution, encoding by using the preset encoder, this initial sub-image according to the target resolution of the target sub-image obtained after transcoding this initial sub-image, to obtain a target code-stream;

for each initial sub-image whose resolution is a cutting resolution, encoding by using the preset encoder, this initial sub-image according to an encoding resolution of this initial sub-image and adding a tag for specified pixels in code-stream information of the obtained code-stream to obtain a target code-stream;

wherein, the encoding resolution is a product of the target resolution of the target sub-image obtained after transcoding this initial sub-image and a specified multiple, wherein the specified multiple is a ratio of the cutting resolution of this initial sub-image to the initial resolution of this initial sub-image, the specified pixels are added pixels in the target sub-image obtained after transcoding the initial sub-image when the target resolution of the target sub-image obtained after transcoding the initial sub-image is increased to the encoding resolution.

17. The electronic device according to claim 16, wherein before encoding by using the preset encoder, this initial sub-image according to an encoding resolution of this initial sub-image, the processor is further configured to, when executing the program stored in the memory, implement the following operations:

determining whether the cutting resolution of this initial sub-image is not greater than the maximum resolution of the input data that can be supported by the preset encoder, and whether the encoding resolution of this initial sub-image is not greater than the maximum resolution of the output data that can be supported by the preset encoder;

if so, encoding by using the preset encoder, this initial sub-image according to the encoding resolution of this initial sub-image;

otherwise, returning to the step of determining an initial resolution of each of the to-be-transcoded initial sub-images.

\* \* \* \* \*